(12) United States Patent
Askarianabayaneh et al.

(10) Patent No.: US 11,837,962 B2
(45) Date of Patent: Dec. 5, 2023

(54) CONTROL SYSTEM AND METHOD FOR DUAL ACTIVE BRIDGE DC/DC CONVERTERS

(71) Applicant: UTI LIMITED PARTNERSHIP, Calgary (CA)

(72) Inventors: Iman Askarianabayaneh, Calgary (CA); Majid Pahlevaninezhad, Calgary (CA); Andrew Michael Knight, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 230 days.

(21) Appl. No.: 17/363,848

(22) Filed: Jun. 30, 2021

(65) Prior Publication Data
US 2022/0014106 A1 Jan. 13, 2022

Related U.S. Application Data

(60) Provisional application No. 63/050,386, filed on Jul. 10, 2020.

(51) Int. Cl.
*H02M 3/335* (2006.01)
*H02M 1/00* (2006.01)

(52) U.S. Cl.
CPC ..... *H02M 3/33584* (2013.01); *H02M 1/0058* (2021.05)

(58) Field of Classification Search
CPC .................. H02M 3/33584; H02M 1/0058
See application file for complete search history.

(56) References Cited

U.S. PATENT DOCUMENTS

| 9,667,157 | B1 * | 5/2017 | Dong | H03K 17/166 |
| 10,211,747 | B2 * | 2/2019 | Agamy | H02M 1/088 |
| 10,389,166 | B1 * | 8/2019 | Sahoo | H02J 3/381 |
| 10,749,441 | B1 * | 8/2020 | Singh | H02M 3/33584 |
| 2008/0291707 | A1 * | 11/2008 | Fang | H02M 1/40 363/39 |
| 2015/0365005 | A1 * | 12/2015 | Panov | H02M 3/33584 307/24 |
| 2017/0279361 | A1 * | 9/2017 | Raju | H02M 3/33507 |
| 2019/0312521 | A1 * | 10/2019 | Cao | H02M 5/4585 |
| 2022/0337166 | A1 * | 10/2022 | Chan | H02M 1/4233 |

FOREIGN PATENT DOCUMENTS

| AU | 2014202274 A1 * | 1/2015 | ......... A61B 18/1206 |
| EP | 2827467 A2 * | 1/2015 | ............. H02J 3/385 |
| WO | WO-2012099957 A1 * | 7/2012 | ............. H02J 9/062 |
| WO | WO-2017123241 A1 * | 7/2017 | ........... G01R 19/175 |

\* cited by examiner

*Primary Examiner* — Sisay G Tiku
(74) *Attorney, Agent, or Firm* — Brion Raffoul

(57) ABSTRACT

Control system and method for controlling power flow in dual active bridge converters. The control system comprises a compensator, a feedback unit, and a modulator. An outer loop provides a reference signal. The output of the compensator are the control parameters for the modulator. The feedback unit samples the transformer current once every half switching cycle to thereby determine a power level. The power level is used to determine a modulation technique to apply. The modulation technique is one of phase-shift modulation (PSM), variable duty cycle modulation (VDM), or triangular current mode modulation (TCM).

18 Claims, 29 Drawing Sheets

CONTROL SYSTEM AND METHOD FOR DUAL ACTIVE BRIDGE DC/DC CONVERTERS

RELATED APPLICATIONS

This application is a Non-Provisional Patent application which claims the benefit of U.S. Provisional Application No. 63/050,386 filed Jul. 10, 2020.

TECHNICAL FIELD

The present invention relates to dual active bridge (DAB) DC/DC converters. More specifically, the present invention relates to controlling current and voltage in circuits that include DAB converters.

BACKGROUND

Bidirectional DC/DC converters are used in many applications where bidirectional power flow is required, such as uninterruptible power supplies (UPSs), electric vehicles (EVs), vehicle-to-grid (V2G) and grid-to-vehicle (G2V) systems, and energy storage systems. In particular, battery charging applications must be capable of operating in wide range of load conditions. Because of this, converters capable of achieving stable and robust operation over the entire load range are required.

One of the most prominent bidirectional DC/DC converters is the dual active bridge (DAB) power converter. Typical control systems for DAB converters are closed-loop feedback systems that include a compensator and a modulator. The modulator creates switching signals based on four controllable parameters of a current in the DAB converter. These parameters are identified from an output of the compensator, which receives a current signal from the DAB converter and compensates for error in the current signal. Four control parameters are typically used: phase-shift ($\varphi$), duty cycle of bridge A ($D_A$), duty cycle of bridge B ($D_B$), and switching frequency ($f_s$).

FIG. 1 depicts a conventional control method according to the prior art. As can be seen, the control system is a cascaded control system, which comprises an outer loop and an inner loop. The feedback of the outer loop is the output voltage of the converter. The outer loop creates the reference signal (reference current) for the inner loop. The feedback for the inner loop is the input DC bus current. Thus, the outer loop regulates the output DC voltage, while the inner loop regulates the input DC current. Typically, linear control techniques and look-up-tables (LUT) are used for both the outer loop and the inner loop. These linear techniques are optimized for a fixed operating point (chosen to be quiescent operation). As a result, they show poor performance when the converter operates over wide input/output conditions and wide load conditions. They may demonstrate sluggish transient response, poor tracking, and low stability margins for some operating conditions.

The most common modulation scheme when operating at high power is the phase-shift-modulation scheme (PSM). In PSM, the duty cycles ($D_A$ and $D_B$) and the switching frequency ($f_s$) of the converter are constant. Thus, the phase shift ($\varphi$) is solely responsible for controlling the power flow in DAB converters. The main advantages of using PSM for controlling DAB converters are the simplicity of control and the ability to provide zero-voltage switching (ZVS) for heavy loads. However, DAB converters show poor performance when PSM is used at low or medium-level power loads.

Other modulation techniques, including variable duty cycle modulation (VDM) and triangular current mode modulation (TCM) may be used at medium and low load levels, respectively. However, each of these techniques is similarly limited to a narrow range of inputs. Additionally, these modulation schemes are operated with half cycle symmetry. This may result in current spikes during transients. Such current spikes are often harmful to components of the converters, and can also cause temporary saturation of the transformer component of the converter, thereby reducing the overall power efficiency.

Thus, there is a need for a control system and method that performs well over a range of input conditions and a range of load conditions. Additionally, there is a need for a control method that prevents temporary saturation of the transformer.

SUMMARY

This document discloses a control system and method for controlling power flow in dual active bridge converters. The control system consists of cascaded control with an outer loop and an inner loop. The outer loop creates an inner loop reference signal. The inner loop includes a new compensator, a feedback unit and a modulator. A feedback unit samples the transformer primary current every half switching cycle. The output of this feedback unit is either the transformer primary current or the inverse sign of this (depending on the half switching cycle). The inner loop reference signal is subtracted from the output of the feedback unit to create an inner loop error. A geometric-sequence-control (GSC), which is a model-based predictive current control technique, is used as the compensator to create the control parameters from this error. The control parameters are used by the modulator to create the switching instants for the switches (i.e. when to switch). The modulation technique is one of phase-shift modulation (PSM), variable duty cycle modulation (VDM), or triangular current mode modulation (TCM). The compensator inside the control system allows the inner loop error to approach zero in a fast and seamless manner.

In a first aspect, this document discloses a control system for a dual active bridge (DAB) DC/DC converter, said control system comprising: a feedback unit; a compensator; and a modulator, wherein said feedback unit measures a transformer current from a bridge component of said DAB converter as input and wherein an inner loop reference current is subtracted from an output of said feedback unit; wherein an output of said subtraction is passed to said compensator; wherein said compensator determines control parameters for said modulator; and wherein said modulator applies a modulation technique based on said control parameters to change a switching pattern to thereby control said transformer current and to thereby control a power flow in said circuit.

In another embodiment, this document discloses a control system wherein said modulation technique is one of: phase-shift modulation (PSM), variable duty cycle modulation (VDM), and triangular current mode modulation (TCM).

In another embodiment, this document discloses a control system wherein said feedback unit samples said transformer current once every half switching cycle.

In another embodiment, this document discloses a control system wherein said compensator updates said control parameters once every half switching cycle.

In another embodiment, this document discloses a control system wherein said modulator updates said switching pattern every half switching cycle.

In another embodiment, this document discloses a control system wherein said transformer current is modified based on an output of said modulator.

In another embodiment, this document discloses a control system wherein said compensator determines said control parameters using a geometric-sequence-control (GSC) method.

In another embodiment, this document discloses a control system wherein said GSC method is based on an error in said inner loop reference current.

In another embodiment, this document discloses a control system wherein said GSC method is applied such that an error in said inner loop reference current decreases in a geometric sequence progression over successive half switching cycle samplings, and wherein said control parameters are by-products of said GSC method.

In another embodiment, this document discloses a control system wherein said control parameters comprise at least one of: a phase shift of the converter, a duty cycle of said bridge component, and a duty cycle of another bridge component of said DAB converter.

In another embodiment, this document discloses a control system wherein said system conforms to at least one of the following conditions:
- when a power level within said circuit is below a first threshold, said modulation technique is triangular current mode modulation (TCM);
- when said power level is between said first threshold and a second threshold, said modulation technique is variable duty cycle modulation (VDM), said second threshold being higher than said first threshold; and
- when said power level is above said second threshold, said modulation technique is phase-shift modulation (PSM).

In a second aspect, this document discloses controlling a power flow within a circuit comprising a dual active bridge (DAB) DC/DC converter, said method comprising the steps of: receiving a current from a bridge component of said DAB converter as input for a compensator; measuring a current from a transformer component of said DAB converter; based on said current, determining control parameters for a modulator; and using said modulator, applying a modulation technique based on said control parameters, to thereby modify said current and to thereby control said power flow in said circuit.

In another embodiment, this document discloses a method wherein said modulation technique is one of: phase-shift modulation (PSM), variable duty cycle modulation (VDM), and triangular current mode modulation (TCM).

In another embodiment, this document discloses a method wherein said control parameters are determined by applying a geometric-sequence-control (GSC) method In another embodiment, this document discloses a method wherein said GSC method is based on inner loop current error.

In another embodiment, this document discloses a method wherein said control parameters are determined by a compensator.

In another embodiment, this document discloses a method wherein said compensator updates said control parameters once every half switching cycle.

In another embodiment, this document discloses a method wherein said GSC method is applied such that an inner loop current error decreases in a geometric sequence progression over successive half switching cycle samplings, and wherein said control parameters are by-products of said GSC method.

In another embodiment, this document discloses a method wherein said control parameters comprise at least one of: a phase shift of the converter, a duty cycle of said bridge component, and a duty cycle of another bridge component of said DAB converter.

In another embodiment, this document discloses a method wherein said method conforms to at least one of the following conditions:
- when a power level within said circuit is below a first threshold, said modulation technique is triangular current mode modulation (TCM);
- when said power level is between said first threshold and a second threshold, said modulation technique is variable duty cycle modulation (VDM), said second threshold being higher than said first threshold; and
- when said power level is above said second threshold, said modulation technique is phase-shift modulation (PSM).

In a further aspect, the present invention provides non-transitory computer-readable media having encoded thereon computer-readable and computer-executable instructions that, when executed, implement a method for controlling a power flow within a circuit comprising a dual active bridge (DAB) DC/DC converter, said method comprising the steps of: receiving a current from a bridge component of said DAB converter as input for a compensator; measuring a current from a transformer component of said DAB converter; based on said current, determining control parameters for a modulator; and using said modulator, applying a modulation technique based on said control parameters, to thereby modify said current and to thereby control said power flow in said circuit.

In another embodiment, this document discloses non-transitory computer-readable media wherein said modulation technique is one of: phase-shift modulation (PSM), variable duty cycle modulation (VDM), and triangular current mode modulation (TCM).

In another embodiment, this document discloses non-transitory computer-readable media wherein said control parameters are determined by applying a geometric-sequence-control (GSC) method.

In another embodiment, this document discloses non-transitory computer-readable media wherein said GSC method is based on inner loop current error.

In another embodiment, this document discloses non-transitory computer-readable media wherein said control parameters are determined by a compensator.

In another embodiment, this document discloses non-transitory computer-readable media wherein said compensator updates said control parameters once every half switching cycle.

In another embodiment, this document discloses non-transitory computer-readable media wherein said GSC method is applied such that an inner loop current error decreases in a geometric sequence progression over successive half switching cycle samplings, and wherein said control parameters are by-products of said GSC method.

In another embodiment, this document discloses non-transitory computer-readable media wherein said control parameters comprise at least one of: a phase shift of the converter, a duty cycle of said bridge component, and a duty cycle of another bridge component of said DAB converter.

In another embodiment, this document discloses non-transitory computer-readable media wherein the method implemented by the execution of the instructions encoded thereon conforms to at least one of the following conditions: when said power level is below a first threshold, said modulation technique is triangular current mode modulation (TCM); when said power level is between said first threshold and a second threshold, said modulation technique is variable duty cycle modulation (VDM), said second threshold being higher than said first threshold; and when said power level is above said second threshold, said modulation technique is phase-shift modulation (PSM).

BRIEF DESCRIPTION OF THE DRAWINGS

The present invention will now be described by reference to the following figures, in which identical reference numerals refer to identical elements and in which.

DETAILED DESCRIPTION

Figure 1:
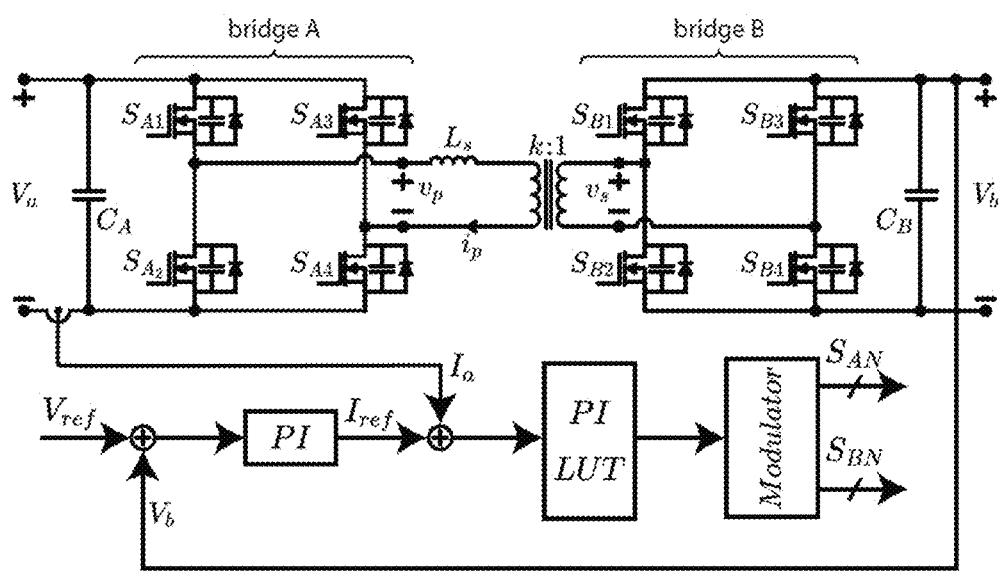
FIG. 1 is a block diagram of a conventional DAB DC/DC converter and a conventional proportional-integral (PI) control system, according to the prior art.

For clarity, Table 1 outlines the meaning of terms and symbols used throughout this document:

TABLE 1

| Acronym/Symbol | Meaning |
| --- | --- |
| k | transformer turns ratio |
| $L_s$ | DAB high frequency network inductance |
| $f_s$ | switching frequency |
| $T_s$ | switching period |
| $V_a$ | DC voltage of port A |
| $V_b$ | DC voltage of port B |
| $v_{a,[n]}$ | voltage of port A for half cycle [n] |
| $v_{b[n]}$ | DC voltage of port A for half cycle [n] |
| $v_p$ | transformer primary voltage |
| $v_s$ | transformer secondary voltage |
| $i_p$ | transformer primary current |
| i[n] | sample current of the transformer primary current at the beginning of half cycle [n] |
| $\Delta i[n]$ | current error of half cycle [n] |
| di[n] | current difference between i[n + 2] and i[n] (i [n + 2] − i[n]) |
| $t_0[n]$ | timing instant when $v_p$ is changed to $+V_\alpha - V_\alpha$ in half cycle [n] |
| $t_1[n]$ | time interval between $t_0[n]$ and when $v_s$ is changed to zero in half cycle [n] |
| $t_2[n]$ | time interval between the end of interval $t_1[n]$ and when $v_s$ is changed |
| $t_3[n]$ | time interval between the end of interval $t_2[n]$ and when $v_p$ is changed |
| P | output power |
| $P_{max}$ | maximum possible power level |
| $P_{BC}$ | power level that corresponds to $\varphi = \varphi_{BC}$ in PSM |
| $P_{ZVS,min}$ | lower power level in which ZVS is achieved with VDM |
| $P_{\Delta,max}$ | maximum achievable power with TCM |
| $D_\alpha$ | duty cycle of bridge A |
| $D_\alpha[n]$ | duty cycle of bridge A for half cycle [n] |
| $D_b$ | duty cycle of bridge B |
| $D_{bmin}$ | duty cycle of bridge B when lowest possible operating power that ZVS can be achieved with VDM when $V_\alpha < kV_b$ |
| $D_{\alpha,min}$ | duty cycle of bridge A when lowest possible operating power that ZVS can be achieved with VDM when $V_\alpha > kV_b$ |
| $D_b[n]$ | duty cycle of bridge B for half cycle [n] |
| $\varphi$ | phase-shift |
| $\varphi[n]$ | phase-shift for half cycle [n] |
| $\varphi_{BC}$ | minimum phase-shift in which ZVS is achieved with PSM |
| $m_1 = \dfrac{V_a + kV_b}{L_s}$ | slope of current |
| $m_2 = \dfrac{V_a 1 - kV_b}{L_s}$ | slope of current |

TABLE 1-continued

| Acronym/Symbol | Meaning |
| --- | --- |
| $m_3 = \dfrac{-kV_b}{L_s}$ | slope of current |
| $m_4 = \dfrac{V_a}{L}$ | slope of current |
| x[n] | in general, x[n] is the value of x for half cycle [n] |
| PSM | phase-shift modulation |
| VDM | variable duty cycle modulation |
| TCM | triangular current mode modulation |
| ZVS | zero-voltage switching |

Additionally, to better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

The present invention provides a control system and method that allows DAB converters to operate more effectively at a wide range of input and load conditions. In particular, the present invention allows the DAB converter to apply different modulation techniques based on the control parameters identified. That is, the present invention applies PSM, VDM, or TCM based on parameters of the received signal and feeds back the modulated signal to more effectively compensate for error and control power flows. The compensator of the inner loop of the control system applies a geometric sequence control (GSC) method to determine the control parameters of the modulator. The operating power of the DAB converter determines which modulation technique to apply. Additionally, the control parameters used by the GSC are updated by sampling the input signal every half switching cycle (asymmetric half cycle modulation). This asymmetric half cycle modulation ensures zero DC current in the transformer winding and helps to prevent transformer saturation.

Figure 2:
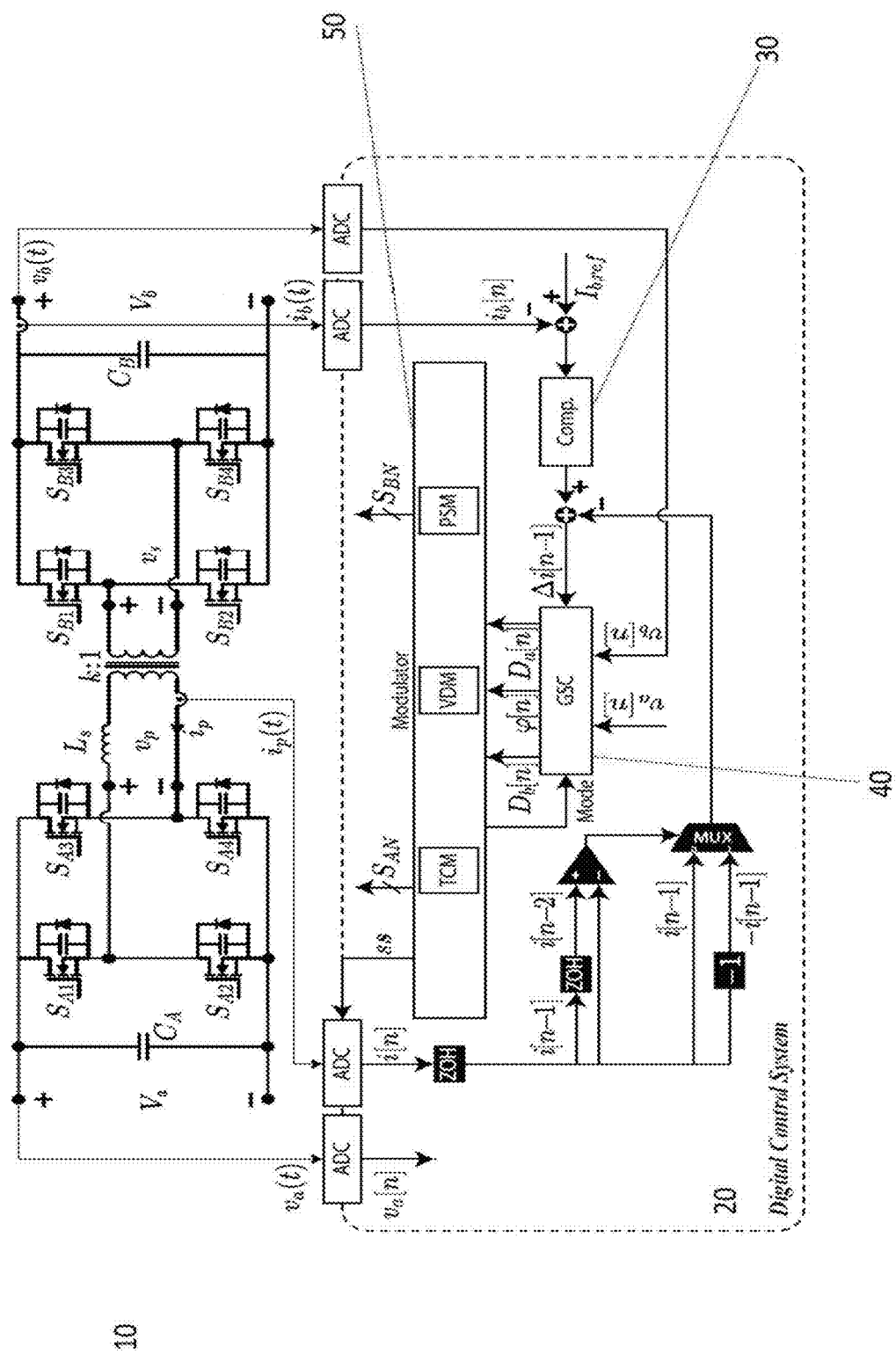
FIG. 2 is a block diagram of a DAB DC/DC converter according to an aspect of the present invention.

FIG. 2 is a block diagram showing an embodiment of control system 10 for a DAB converter according to the present invention. It should be understood that this diagram represents a prototype circuit that was used in experimentation, as discussed in greater detail below. Accordingly, certain design choices were made that should not be seen as limiting the invention. As one example, the configuration of the gates in the bottom left of this diagram should not be taken to limit the invention. Any gate configuration that produces a suitably modified signal can be used.

The compensator 30 receives an output current signal ($i_b(t)$) from one of the bridge components of the DAB converter (in this case, from bridge B). The output of this compensator 30 is passed to the control unit 40. A primary current is measured at a transformer component of said DAB converter ($i_p(t)$) and modified via a series of gates, to thereby produce a modified primary current. A reference signal for the GSC loop (i.e., for the inner loop) is created by an outer loop control. This outer loop control includes $i_b[n]$ as feedback, $I_{b,ref}$ as the reference load, and a compensator to create the reference signal. The current error created by subtracting the reference signal from the modified transformer (i[n−1] or −$i_l$[n−1]) is fed to the GSC scheme to create the control parameters $\varphi$, $D_a$, and $D_b$. These parameters are passed to the modulator 50 and are used to determine a modulation technique to be applied (either TCM, VDM, or PSM). The signal identified as "mode", which is generated inside the modulator 50 and fed back to the control unit 40, identifies which modulation technique should be applied, based on the calculated power level determined from the control parameters. The outputs of the modulator are the switching signals for the switches ($S_{AN}$ and $S_{BN}$) and a sampling signal (ss), which is fed back to the inner loop and used as a basis to determine half cycle switching instants (i.e., when to switch) for measuring the transformer primary current.

It should be clear that there are two compensators in the control system: an outer loop compensator/feedback unit 30 and an inner loop compensator 40. In one aspect of the present invention, the inner loop compensator uses a geometric-sequence-control (GSC) method while the feedback unit samples the transformer current once every half cycle and modifies it. Then, the inner loop reference signal (which is provided as output from the outer loop) is subtracted from this modified signal to create the inner loop error. The inner loop compensator 40 uses this inner loop error to determine and change the control parameters. The control parameters are used by the modulator 50 to create and change the switching pattern of the switches and to thereby modify the transformer current. This thereby changes the power level.

Conventional DAB Converters

Figure 3A:
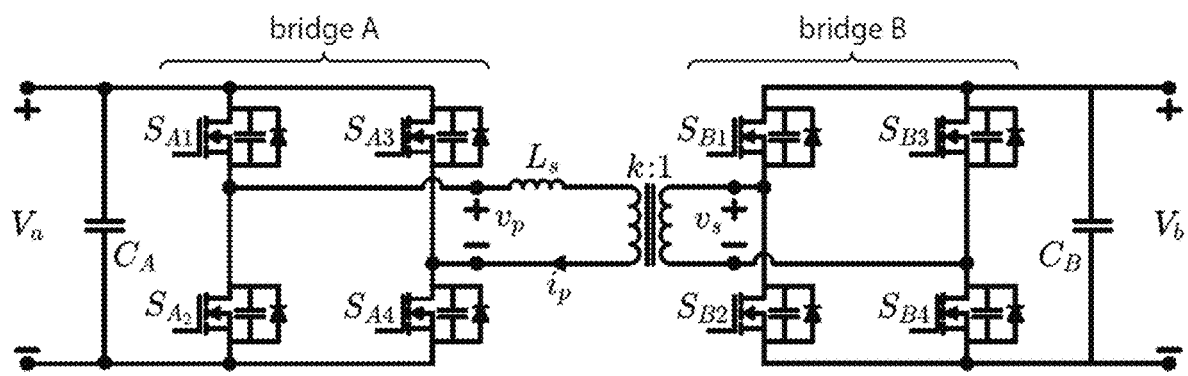
FIG. 3A is an expanded block diagram of a conventional DAB converter, according to the prior art.

FIG. 3A depicts the schematic diagram of a typical DAB DC/DC converter. DAB DC/DC converters are used as an interface to allow bidirectional power flow between two DC buses ($V_a$ and $V_b$). Due to the four controlling parameters of DAB converters, the shape of the transformer current is very flexible, in that, by utilizing a combinations of these controlling parameters, ZVS and low RMS current can be achieved. RMS current is typically lower when the current is close to a square wave shape.

Figure 3B:
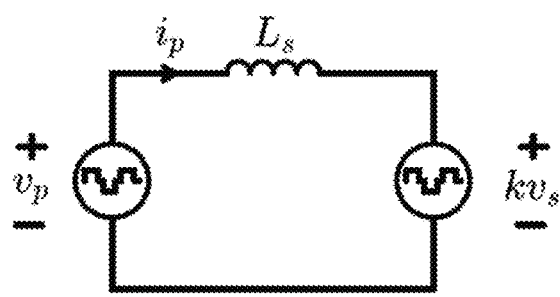
FIG. 3B is a schematic diagram of the equivalent circuit of a DAB converter, according to the prior art.

DAB converters consist of two active bridges (Bridge A and Bridge B), a high frequency network (a transformer with series inductance), and two filter networks ($C_A$ and $C_B$). The two active bridges (A and B) create quasi-square wave voltages ($v_p$ and $v_s$) at the two ends of the high frequency network. FIG. 3B depicts the equivalent circuit of a DAB converter (in a lossless conversion), where n is the transformer turns ratio, $L_s$ is the series inductance, and $i_p$ is the current in the transformer primary winding. Based on the switching pattern, $v_p$ can hold three states: $+V_a$, $-V_a$, and 0; similarly $v_s$ has three states: $+V_b$, $-V_b$, and 0. The current, $i_p$, is calculated as:

$$i_p(t) = \frac{1}{L_s}\int_{t_0}^{t}(v_p - kv_s)dt + i_p(t_0) \tag{1}$$

In steady-state operation, $$v_p(t) = v_p\left(t + \frac{T_s}{2}\right), \text{ and} \tag{2}$$

$$v_s(t) = v_s\left(t + \frac{T_s}{2}\right). \tag{3}$$

When there is no DC current present in the transformer winding ($i_p$=0), $i_p(t)$ is also equal to $$i_p(t) = i_p\left(t + \frac{T_s}{2}\right). \tag{4}$$

Figure 4:
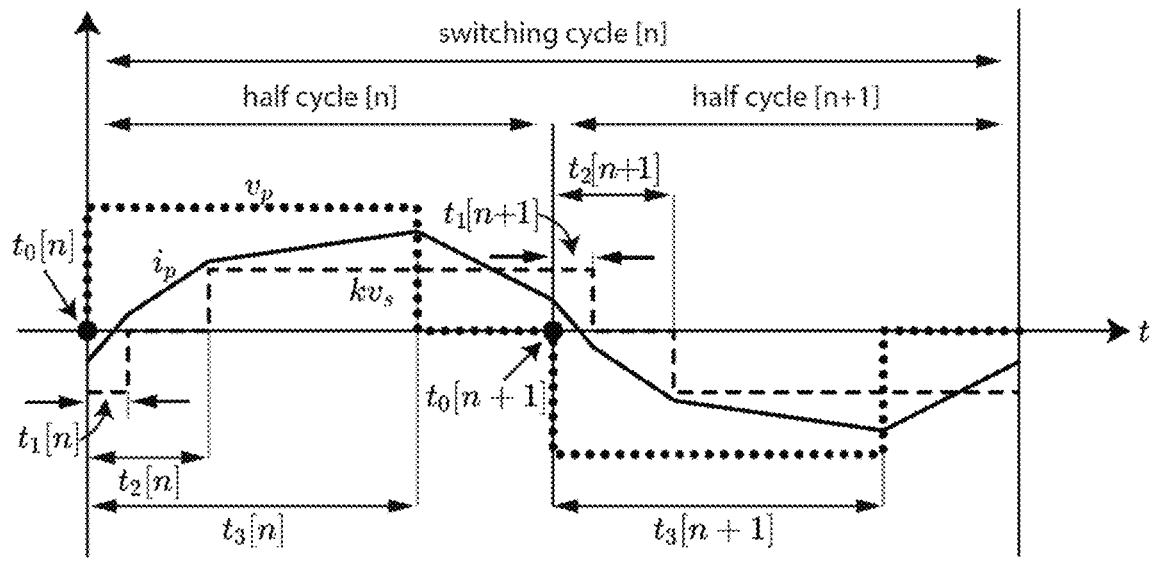
FIG. 4 is a plot showing three steady state waveforms (specifically, $v_p$, $kv_s$, and $i_p$), in conventional DAB converters, according to the prior art.

FIG. 4 depicts three steady state waveforms (specifically, $v_p$, $kv_s$, and $i_p$), in conventional DAB converters, when ZVS is achieved for all the switches (that is, where the DC current of $i_p$ is zero). In FIG. 4, $t_0$ is defined as the instant when $S_{A1}$ is turning on and $S_{A2}$ has turned off, while $S_{A3}$ is off and $S_{A4}$ is on. $t_1$ is defined as the instant when $S_{B1}$ is turning on and $S_{B2}$ has turned off while $S_{B3}$ and $S_{B4}$ are on and off. The ZVS criteria represented in this figure obey the following relations:

$$i_p(t_0) < 0 \quad (5)$$

$$i_p(t_1) > 0 \quad (6)$$

$$1-(D_a+D_b) < \varphi < D_a+D_b \quad (7)$$

The steady-state value of $i_p(t_0)$, $i_p(t_1)$, and the output power flow P in a lossless conversion can be derived as follows:

$$i_p(t_0)[n] = \frac{1}{2L_s f_s}((-D_a[n])V_a + (1-D_a[n]-\varphi[n])kV_b) \quad (8)$$

$$i_p(t_1) = \frac{1}{2L_s f_s}((D_b p[n]+\varphi-1)V_a + (D_b[n])kV_b) \quad (9)$$

$$P = \frac{kV_a V_b}{2\,L_s f_s}\left(\frac{1}{4} - \left(\left(D_a[n]-\frac{1}{2}\right)^2 + \left(D_b[n]-\frac{1}{2}\right)^2 + \left(\varphi[n]-\frac{1}{2}\right)^2\right)\right) \quad (10)$$

where $$\varphi[n] = \frac{1}{2} + t_1[n]f_s + t_2[n]f_s - t_3[n]f_s,\; 0 < \varphi[n] < 0.5 \quad (11)$$

$$D_a[n] = t_3[n]f_s\; 0 < D_a[n] < 0.5 \quad (12)$$

$$D_b[n] = \frac{1}{2} + t_1[n]f_s - t_2[n]f_s\; 0 < D_b[n] < 0.5 \quad (13)$$

where $\varphi[n]$ is the phase shifts for the $n^{th}$ half cycle, and $D_a[n]$ and $D_b[n]$ are the duty cycles for the $n^{th}$ cycle of bridge A and bridge B, respectively. Thus, $\frac{1}{2}\varphi T_s$ is the time difference between the center points of the two quasi-square waveform: $v_p$ and $v_s$.

Using (8) and (9), the ZVS criteria can be rewritten as:

$$i_p(t_0) < 0 \rightarrow \frac{V_a}{kV_b} > \frac{1-\varphi-D_a}{D_a} \quad (14)$$

$$i_p(t_1) > 0 \rightarrow \frac{kV_b}{V_a} > \frac{1-\varphi-D_b}{D_b} \quad (15)$$

$$1-(D_a+D_b) < \varphi < D_a+D_b \quad (16)$$

Figure 5A:
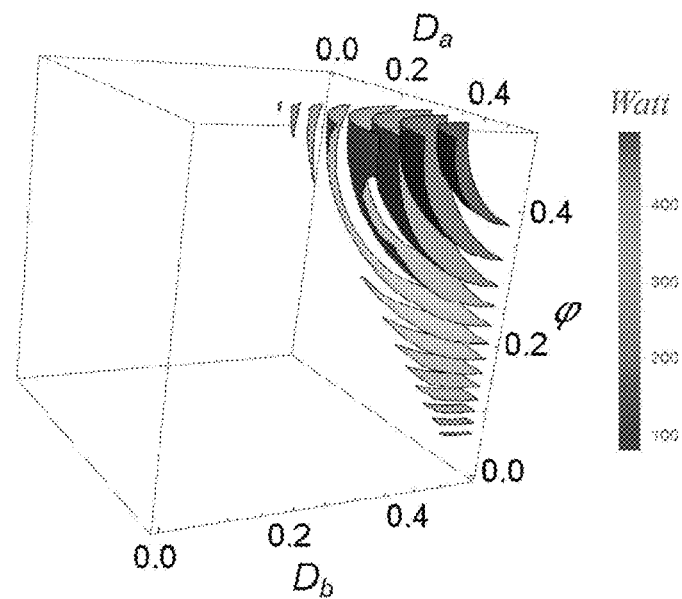
FIG. 5A is a 3-dimensional illustration of the zero-voltage switching (ZVS) region of the conventional DAB converter, according to the prior art.
Figure 5B:
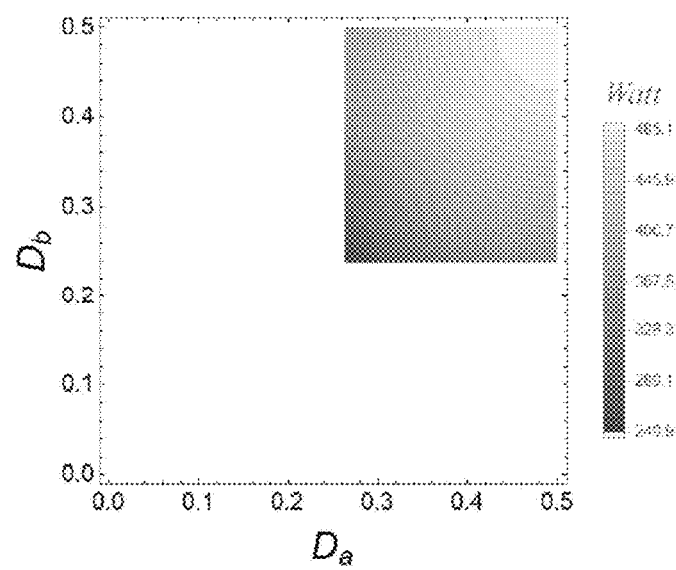
FIG. 5B is a cross-section of FIG. 5A at $\varphi=0.5$.
Figure 5C:
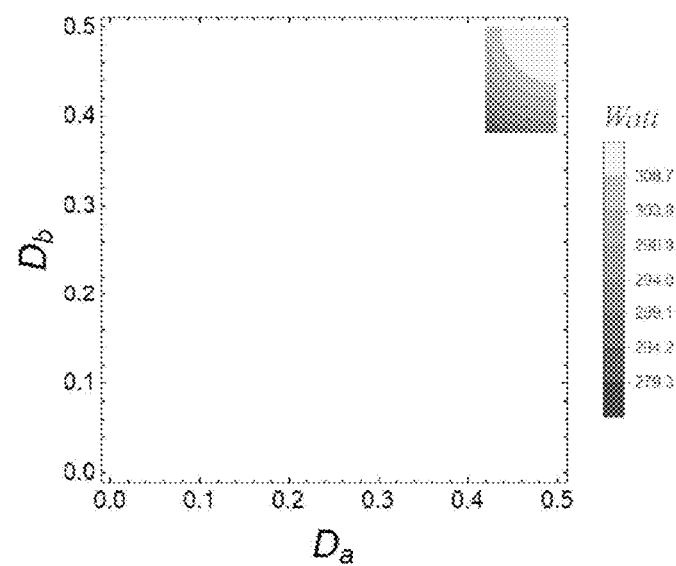
FIG. 5C is a cross-section of FIG. 5A at $\varphi=0.2$.

FIG. 5A is a 3-dimensional illustration of the ZVS region of the conventional DAB converter, when $V_a=90\;V_{DC}$, $V_b=110\;V_{DC}$, $f_s=250$ kHz, n=0.9, and $L_s=10\;\mu H$. This figure depicts all the possible combinations of the control parameters $D_a$, $D_b$, $\varphi$ that comply with the constraints given in (14), (15), and (16). The color bar on the right shows the power levels of the converter for each contour. FIG. 5B is a 2-dimensional representation that shows the cross section of FIG. 5A for $\varphi=0.5$. Similarly, FIG. 5C shows the cross section of FIG. 5A for $\varphi=0.2$. The bar on the right of each figure shows the power level for each contour.

Hybrid Modulation Scheme
Phase-Shift Modulation (PSM)

In PSM, the duty cycles $D_a$ and $D_b$ are equal to 0.5. That is, the phase-shift, $\varphi$, is solely responsible for controlling power flow. The ZVS criteria for PSM can be derived as:

$$0 < \varphi < 0.5 \quad (17)$$

$$\min\left\{\frac{V_a}{kV_b}, \frac{kV_b}{V_a}\right\} > 1-2\varphi \quad (18)$$

The extreme cases, where $\varphi=0.5$ and $\varphi=0$ correspond to the maximum and minimum power flow with the PSM modulation, respectively, can be written as follows:

$$\min\left\{\frac{V_a}{kV_b}, \frac{kV_b}{V_a}\right\} > 0\,\varphi = 0.5 \quad (19)$$

$$\min\left\{\frac{V_a}{kV_b}, \frac{kV_b}{V_a}\right\} > 1\,\varphi = 0 \quad (20)$$

The minimum phase-shift for which ZVS is achieved with PSM is called the "boundary condition phase-shift" ($\varphi_{BC}$). ZVS is lost for phase-shifts lower than $\varphi_{BC}$. Equation (18) can be rewritten to find $\varphi_{BC}$ as follows:

$$\varphi_{BC} = \frac{1}{2}\left(1 - \min\left\{\frac{V_a}{kV_b}, \frac{kV_b}{V_a}\right\}\right) \quad (21)$$

Thus, in the hybrid modulation scheme of the present invention, PSM can be effectively used for phase-shifts within the [$\varphi_{BC}$ to 0.5] interval. That is, PSM is used for operating conditions where the power flow ranges between [$P_{BC}$ to $P_{max}$], where $P_{BC}$ corresponds to the power flow when $\varphi=\varphi_{BC}$ and $P_{max}$ corresponds to the power flow when $\varphi=0.5$. For power levels lower than $P_{BC}$, which correspond to phase-shifts lower than $\varphi_{BC}$, VDM is applied.

Variable Duty Cycle Modulation (VDM)

A form of VDM is used that can achieve ZVS at power levels lower than $P_{BC}$ by only using one control parameter. From (10), it can be inferred that, in order to decrease the power flow, either $\varphi$, $D_a$, or $D_b$ has to be decreased. In the VDM of the present invention, $\varphi$ is kept constant at $\varphi=\varphi_{BC}$ and one of the duty cycles ($D_a$ or $D_b$) decreases while the other remains at 0.5. Decreasing both duty cycles at the same time while $\varphi=\varphi_{BC}$ would cause the loss of ZVS. The relation between $kV_b$ and $V_a$ determines which of the duty cycles ($D_a$ or $D_b$) can be changed to maintain ZVS, as follows:

Case 1. $V_a < kV_b$: In this case, $D_a=0.5$ and $D_b$ is used to control the power flow.

Case 2. $kV_b < V_a$: In this case, $D_b=0.5$ and $D_a$ is used to control the power flow.

Case 3. $kV_b = V_a$: In this case, PSM covers the whole range of power levels since $\varphi_{BC}=0$ and $P_{BC}=0$. Therefore, there is no need for VDM in this scenario.

Case 1. $V_a < kV_b$

According to (21), $\varphi_{BC}$ can be calculated as:

$$\varphi_{BC} = \frac{1}{2}\left(1 - \frac{V_a}{kV_b}\right) \quad (22)$$

Phase-shifts lower than $\varphi_{BC}$ violate the ZVS criteria introduced in (14). That is, if $\varphi < \varphi_{BC}$, $i_p(t_0)$ will become positive. Similarly, reducing $D_a$ while $\varphi=\varphi_{BC}$ violates the ZVS criteria in (14). Thus, in this case, $D_b$ is the only control parameter while $\varphi$ and $D_a$ remain at $\varphi_{BC}$ and 0.5, respectively. As $D_b$ decreases, the ZVS criteria in (15) and (16)

becomes more stringent. The lowest power level ($P_{ZVS,min}$) under ZVS is when $\varphi=\varphi_{BC}$ and $D_b=D_{bmin}$, where $$D_{bmin}=0.5-\varphi_{BC} \tag{23}$$

and $P_{ZVS,min}$ can be calculated from:

$$P_{ZVS,min} = \frac{kV_aV_b}{2\,L_sf_s}(\varphi_{BC}-2\varphi_{BC}^2) \tag{24}$$

Case 2. $kV_b<V_a$
According to (21), $\varphi_{BC}$ can be calculated as:

$$\varphi_{BC} = \frac{1}{2}\left(1-\frac{kV_b}{V_a}\right) \tag{25}$$

In this case, $D_a$ is required to control the power flow. Similar to the previous case, $D_{amin}$ can be calculated as $$D_{amin}=0.5-\varphi_{BC} \tag{26}$$

and $P_{ZVS,min}$ can be calculated as in (24).

Thus, with the hybrid modulation, ZVS can be achieved over ($P_{ZVS,min}<P<P_{max}$), where VDM is used for $P_{ZVS,min}<P<P_{BC}$ and PSM is used for $P_{BC}<P<P_{max}$.

Case 3. $kV_b=V_a$

Again, as PSM covers the whole range of power levels in this case, there is no need for VDM in this scenario.

Triangular Current Mode Modulation (TCM)

Figure 6A:
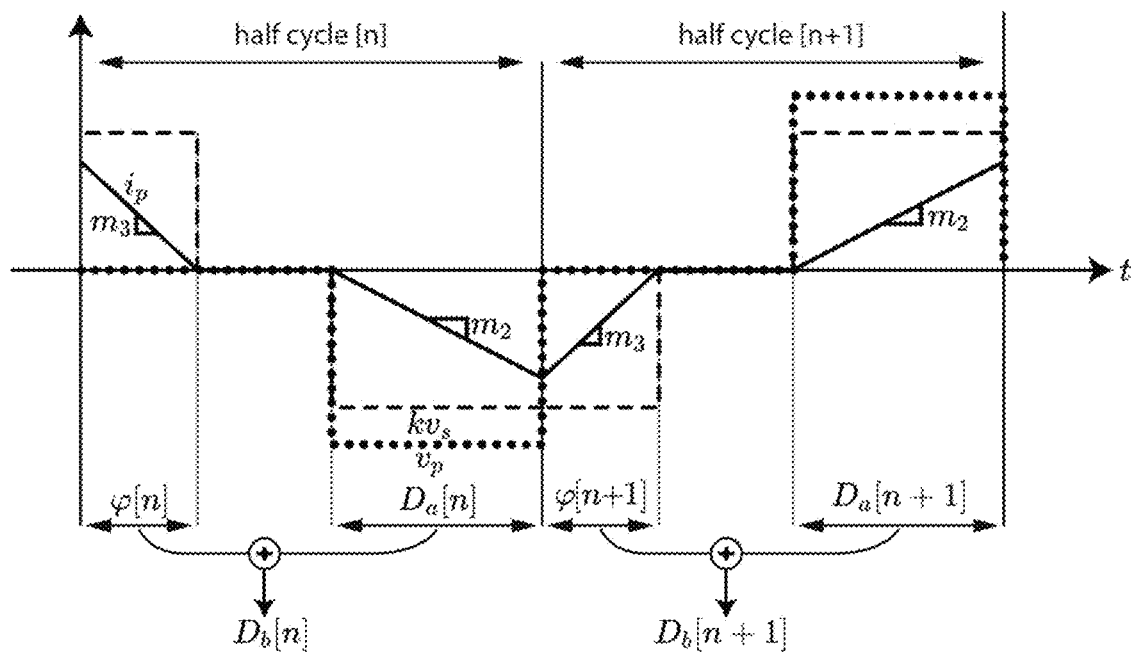
FIGS. 6A and 6B are plots showing waveforms produced by triangular current mode modulation, according to the prior art.
Figure 6B:
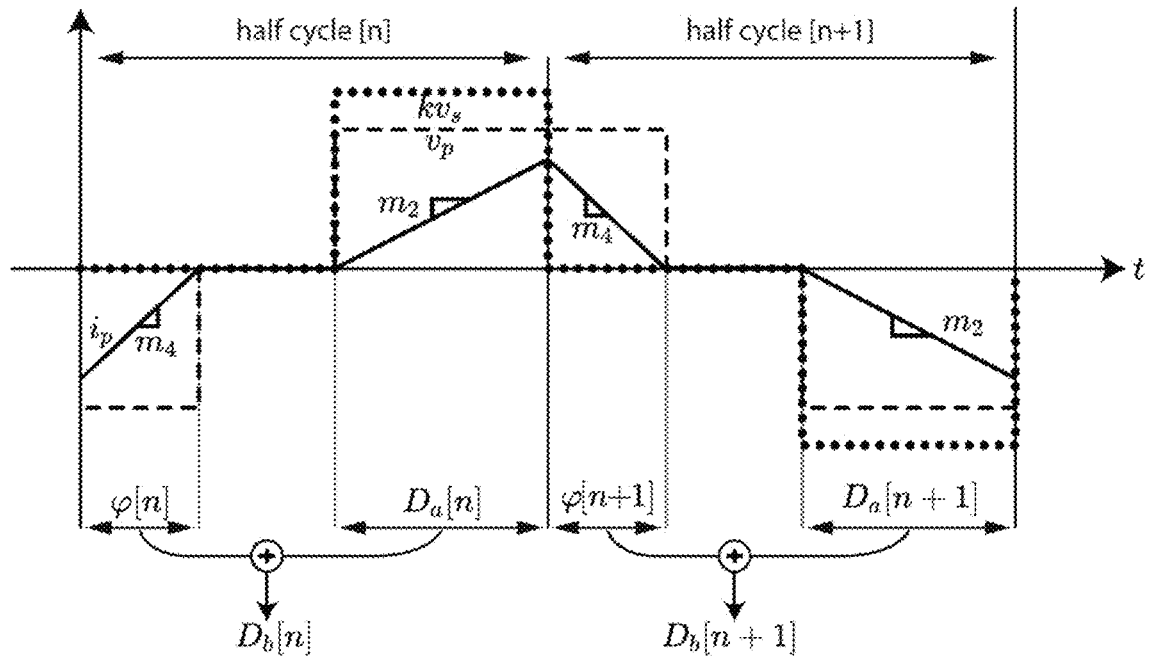

At low power operations, TCM modulation shows the lowest RMS current in the transformer primary winding. Thus, this modulation scheme is implemented for power levels below $P_{ZVS,min}(P<_{ZVS,min})$. The key waveforms of the TCM modulation are depicted in FIGS. 6A and 6B. At steady-state operation, the control variables for all half cycles are equal $(\varphi[n]=\varphi[n+1], D_a[n]=D_a[n+2],$ and $D_b[n]=D_b[n+1])$ and $i_p(t)=$ $$i_p\left(t+\frac{T_s}{2}\right).$$

The steady-state equations of power flow and the control variables in the TCM scheme are given in Ref. [1], noted below. These equations can be expressed as:

$$P = \frac{\varphi^2 V_a(kV_b)^2}{L_sf_s(V_a-kV_b)} \tag{27}$$

$$D_a = \frac{-m_3}{m_2}\varphi \quad \text{for } \begin{cases} P<P_{\Delta,max} \\ V_a>kv_b \end{cases}$$

$$D_b = D_a + \varphi$$

$$P = \frac{\varphi^2 kV_b(V_a)^2}{L_sf_s(kV_b-V_a)} \tag{28}$$

$$D_a = \frac{-m_4}{m_2}\varphi \quad \text{for } \begin{cases} P<P_{\Delta,max} \\ V_a<kv_b \end{cases} \text{ where}$$

$$D_b = D_a + \varphi$$

$$m_2 = \frac{V_a-kV_b}{L_s} \tag{29}$$

$$m_3 = \frac{-kV_b}{L_s} \tag{30}$$

$$m_4 = \frac{V_a}{L_s} \tag{31}$$

$P_{\Delta,max}$ is equal to $P_{ZVS,min}$ introduced in (24) ($P_{\Delta,max}=P_{ZVS,min}$); hence, the minimum operating power of the VDM scheme coincides with the maximum power level of the TCM scheme. According to (27) and (28), $\varphi$ is used to control the power flow and the duty cycles ($D_a$ and $D_b$) are calculated as functions of $\varphi$. Thus, in one aspect of the present invention, the control is designed such that $\varphi[n]$ is determined by the GSC control law and the duty cycles for half cycle [n] are derived from:

$$D_a[n] = \left|\frac{kv_b[n]}{v_a[n]-kv_b[n]}\right|\varphi[n] \tag{32}$$

$$D_b[n] = \left|\frac{v_a[n]}{v_a[n]-kv_b[n]}\right|\varphi[n] \tag{33}$$

where $v_a[n]$ and $v_b[n]$ are the voltages of ports A and B for the n$^{th}$ half cycle, respectively.

Geometric Sequence Control (GSC) Method

The GSC method applied by the control unit 40 and the modulator 50 is capable of accurately and seamlessly tracking the reference signal such that the inner current loop error ($\Delta i_p[n]$) decreases in a geometric sequence progression (hence the name geometric-sequence-control (GSC)). GSC is a recursive nonlinear difference equation, which creates the control parameters. The control variables are updated every half switching cycle at the sampling instant. The sampling instants vary depending on the converter operating condition. Table 2 gives a list of these instants for all the conditions with respect to the modulation type and the relationship between $v_a[n]$ and $kv_b[n]$.

TABLE 2

| modulation | condition | sample instant |
|---|---|---|
| *PSM | $v_a[n] > kv_b[n]$ | $v_p$ changes |
|  | $v_a[n] < kv_b[n]$ | polarity |
| *VDM | $v_a[n] > kv_b[n]$ | $v_p$ changes from zero to $\pm v_a[n]$ |
|  | $v_a[n] < kv_b[n]$ | $v_s$ changes from zero to $\pm v_b[n]$ |
| *TCM | $v_a[n] > kv_b[n]$ | $v_p$ changes from $\pm v_a[n]$ to zero |
|  | $va[n] < kv_b[n]$ | $v_s$ changes from $\pm v_b[n]$ to zero |

Figure 7:
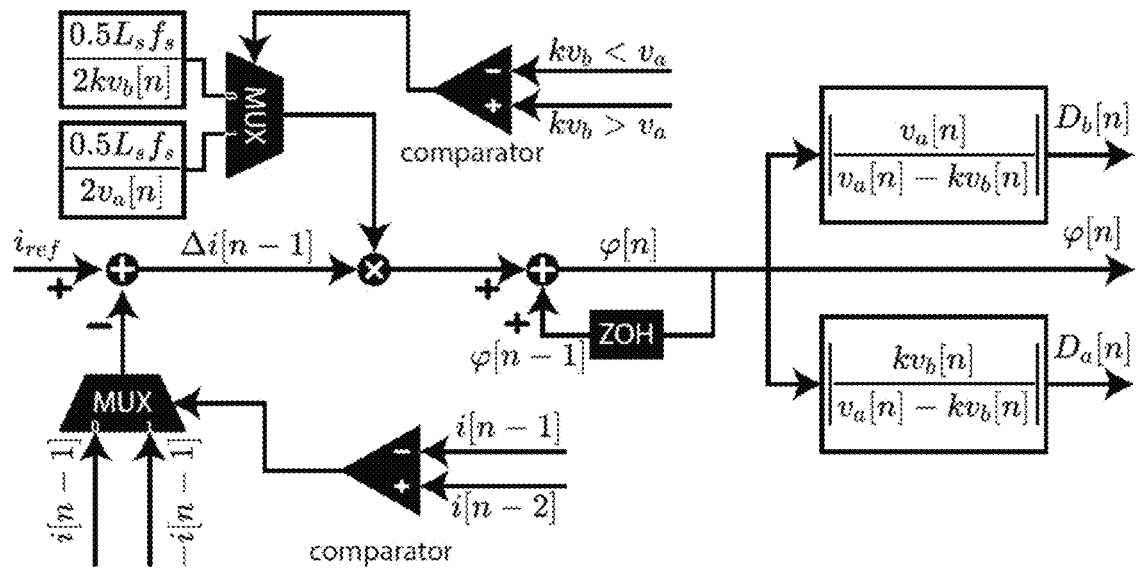
FIG. 7 is a block diagram illustrating an inner loop of the control system according to an aspect of the present invention, when TCM is used.

FIG. 7 depicts the inner loop of the control system of one aspect of the present invention when TCM is used (for power levels of ($P<P_{ZVS,min}$). When $kV_b<V_a$, the GSC control law for the TCM mode is derived as follows:

$$\varphi[n] = \frac{0.5L_sf_s}{2kv_b[n]}\Delta i[n-1]+\varphi[n-1] \tag{34}$$

$$D_a[n] = \frac{kv_b[n]}{v_a[n]-kv_b[n]}\varphi[n] \tag{35}$$

$$D_b[n] = \frac{v_a[n]}{v_a[n]-kv_b[n]}\varphi[n] \tag{36}$$

where $\varphi[n-1]$ is the phase shift of the n−1$^{th}$ half cycle. When $kV_b>V_a$, the GSC control law for the TCM mode is achieved as:

$$\varphi[n] = \frac{0.5L_s f_s}{2v_a[n]}\Delta i[n-1] + \varphi[n-1] \tag{37}$$

$$D_a[n] = \frac{kv_b[n]}{kv_b[n] - v_a[n]}\varphi[n] \tag{38}$$

$$D_b[n] = \frac{v_a[n]}{kv_b[n] - v_a[n]}\varphi[n] \tag{39}$$

Figure 8:
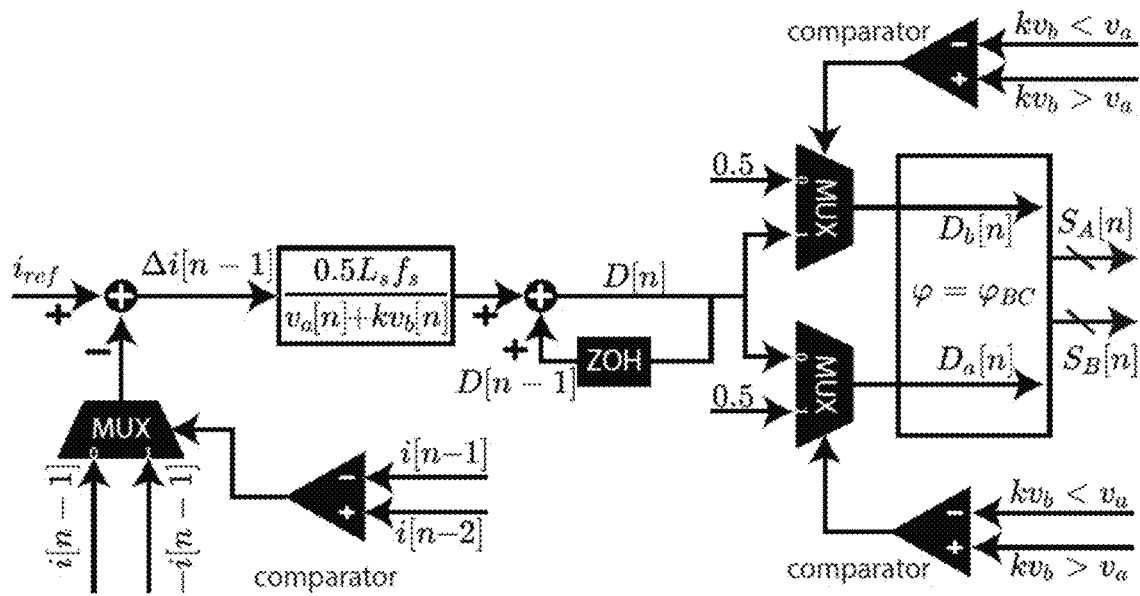
FIG. 8 is a block diagram illustrating an inner loop of the control system according to an aspect of the present invention, when VDM is used.

FIG. 8 depicts the inner loop of the control system of the present invention when VDM is used (for power levels of ($P_{ZVS,min}$<P<$P_{BC}$). When $kV_b$<$V_a$, the GSC control law for the VDM mode is as follows:

$$D_a[n] = \frac{0.5L_s f_s}{v_a[n] + kv_b[n]}\Delta i[n-1] + D_a[n-1] \tag{40}$$

$$D_b[n] = 0.5 \tag{41}$$

where $D_a[n]$ and $D_a[n-1]$ are the duty cycles for $n^{th}$ and $(n-1)^{th}$ half switching cycles of bridge A, respectively. $v_a[n]$ is the voltage of port A for the $n^{th}$ half cycle. When $kV_b$>$V_a$, the GSC control law for the VDM mode is as follows:

$$D_b[n] = \frac{0.5L_s f_s}{v_a[n] + kv_b[n]}\Delta i[n-1] + D_b[n-1] \tag{42}$$

$$D_a[n] = 0.5 \tag{43}$$

where $D_b[k]$ and $D_b[k-1]$ are the duty cycles for $k^{th}$ and $(k-1)^{th}$ half switching cycles of bridge B, respectively. The hybrid modulator uses these duty cycles and $\varphi=\varphi_{BC}$ to create the switching instants.

Figure 9:
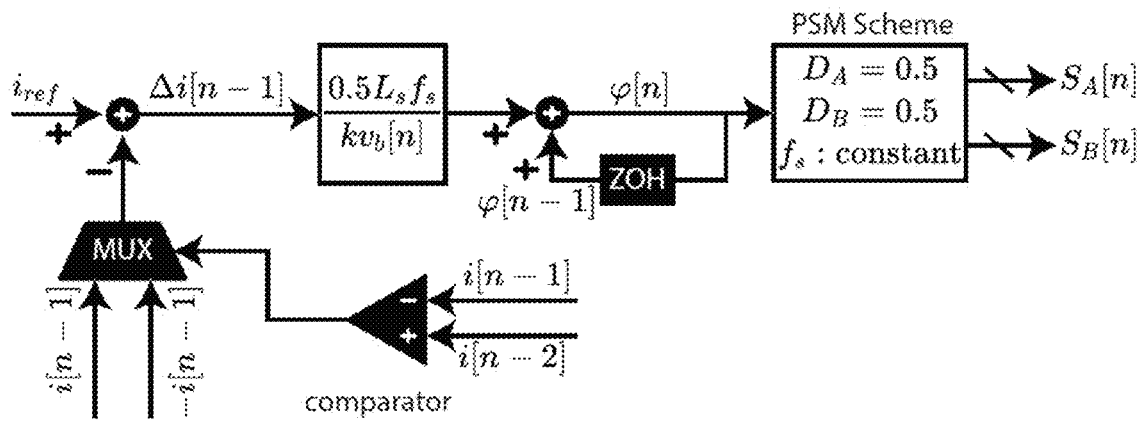
FIG. 9 is a block diagram illustrating an inner loop of the control system according to an aspect of the present invention, when PSM is used.

FIG. 9 depicts the inner loop of the control system of one aspect of the present invention when PSM is used. For this aspect of the present invention, the GSC control law for PSM is defined as follows:

$$\varphi[n] = 0.5\frac{L_s f_s}{kv_b[n]}\Delta i[n-1] + \varphi[n-1] \tag{44}$$

where $\varphi[n]$ and $\varphi[n-1]$ are the phase-shifts for $n^{th}$ and $(n-1)^{th}$ half switching cycles, respectively. $\Delta i_{p,t_0}[k-1]$ is the discrete current error (i.e. $\Delta i_p = i_{ref} - i_p$) for the $(n-1)^{th}$ half cycle at $t=t_0$, and $v_b[n]$ is the voltage of port B in the $n^{th}$ half cycle.

Derivation of GSC for PSM

Figure 10:
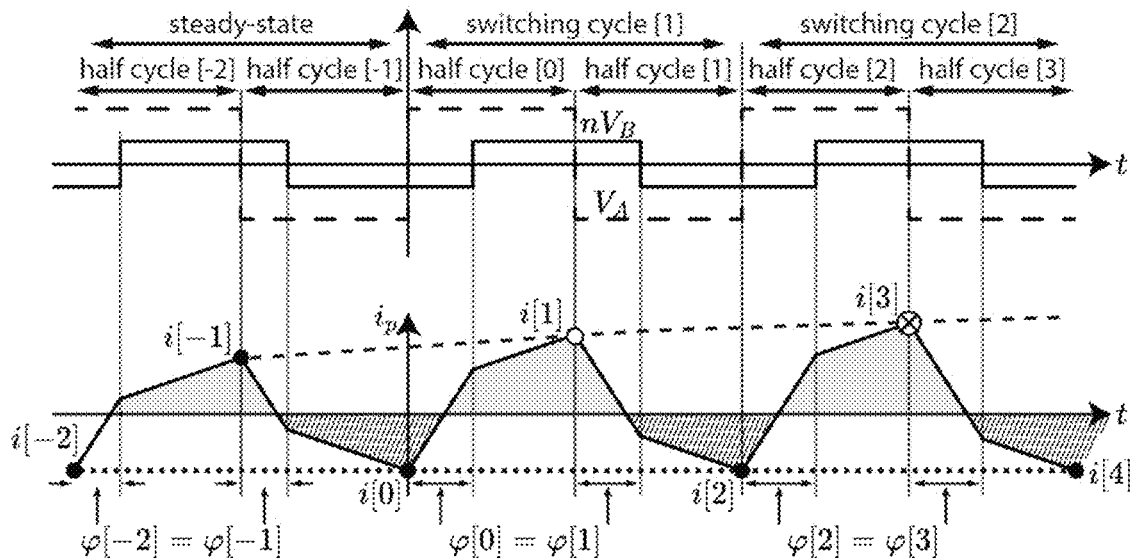
FIG. 10 is a plot showing an exemplary transient response of the DAB converter according to the prior art.

FIG. 10 depicts an exemplary transient response of the DAB converter when the phase-shift changes in response to a step change in the reference current (waveforms $i_p$, $v_p$, and $v_s$), using a conventional control method. As can be seen, the change in the phase-shift ($\varphi[n]$) in response to transients creates imbalance in the transformer current waveform. This imbalance may result in a DC component that saturates the transformer during transients.

Specifically, in FIG. 10, the converter starts the transient from half cycle [0]. That is, the converter is at steady-state for the half cycles [−2] and [−1]. In the steady-state cycle, $\varphi[-2]=\varphi[-1]$ and the magnitudes of the sampled currents (illustrated by solid dots) are equal (i.e., i[−2]=i[−1]=i[0]). The step change in the reference signal applied at the switching cycle 1 causes the phase-shift to increase. The increase in the phase-shift $\varphi$ (i.e., $\varphi[0]=\varphi[1]$ & $\varphi[2]=\varphi[3]$ & . . . ) results in the increase in the sampled currents at the beginning of odd cycles (i[1]<i[3]), while the sampled currents at the beginning of even half cycles do not change (i[0]=i[2]=i[4]). The trajectories of these sampled currents are illustrated in FIG. 10. Such asymmetrical growth of $i_p$ causes the imbalance between its positive half cycle and its negative half cycle, leading to a temporary saturation of the transformer. The main issue stems from the fact that the phase-shift is constant in every switching cycle (two consecutive half cycles) during transient (e.g., $\varphi[0]=\varphi[1]$ & $\varphi[2]=\varphi[3]$). In order to eliminate this issue, the GSC method for this aspect of the present invention changes $\varphi$ every half cycle (i.e., $\varphi[0]\neq\varphi[1]$ & $\varphi[2]\neq\varphi[3]$).

Figure 11A:
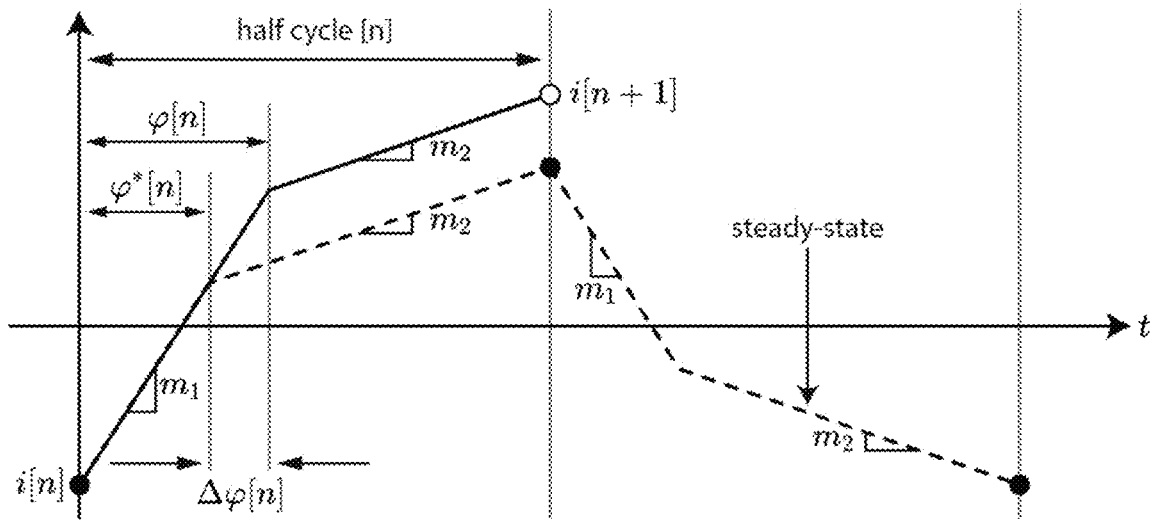
FIGS. 11A and 11B are plots showing $i_p$ with different phase-shifts for each half cycle.
Figure 11B:
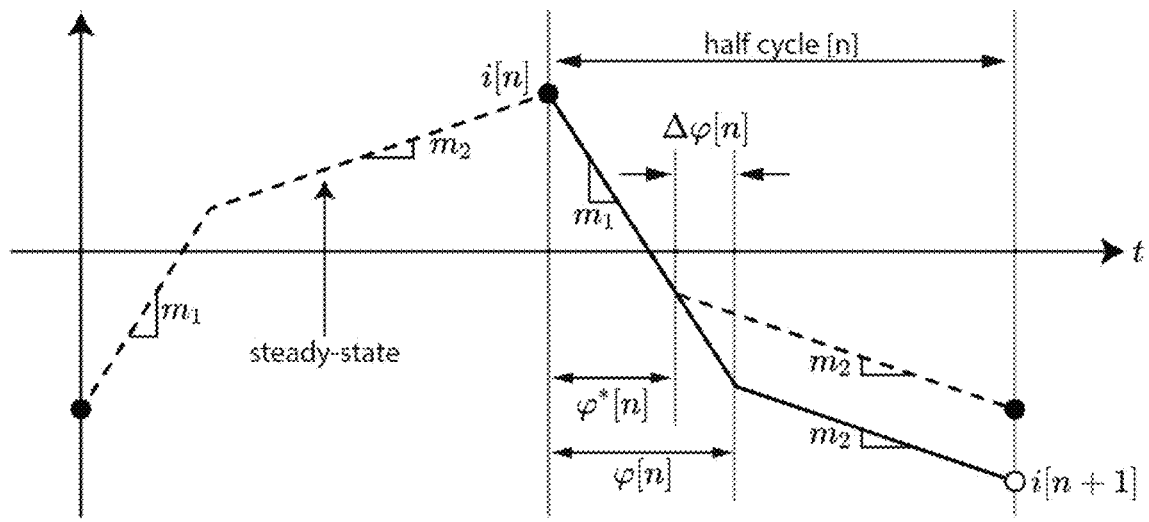

FIGS. 11A and 11B depict the deviation of $i_p$ when there is a change in the phase-shift within a switching cycle (i.e., different phase-shifts for each half cycle). FIG. 11A depicts the first half cycle [n] when $v_p$>0. To better describe the changes in $i_p$ changes when there are changes in the phase-shift at each half cycle, $\varphi*[n]$ is introduced. $\varphi*[n]$ can be defined as the only value of phase-shift for half cycle [n] that corresponds to a current waveform, where the magnitude of the sampled current at the end of the half cycle [n] is equal to its beginning sampled current (i[n]). This current waveform corresponding to $\varphi*[n]$ is depicted by a dashed line, which shows a steady-state current waveform when the reference value is equal to the magnitude of the sampled current at the beginning of the half cycle [n]. The solid line in half cycle [n] is the actual current of $i_p$, which corresponds to a phase-shift of $\varphi[n]$. The difference between actual phase-shift and the steady-state phase-shift for half cycle [n] is:

$$\Delta\varphi[n]=\varphi[n]-\varphi*[n] \tag{45}$$

By using the geometry in FIG. 11, the following can be derived for $v_p$>0:

$$\frac{i[n+1]+i[n]}{T_s/2} = (m_1 - m_2)\Delta\varphi[n] \tag{46}$$

where $m_1$ and $m_2$ are the slopes and can be calculated as:

$$m_1 = \frac{V_a + kV_b}{L_s} \tag{47}$$

FIG. 11B depicts the deviation of $i_p$ for the half cycle [n] when $v_p$<0. Similar to the first half cycle, $\varphi*[n]$ for the second half cycle is defined such that the current value at the end of the second half cycle is equal to −i[n]. In this case, the following relationship is derived according to FIG. 11B (for $v_p$<0):

$$\frac{-i[n+1]-i[n]}{T_s/2} = (m_1 - m_2)\Delta\varphi[n] \text{ where} \tag{48}$$

$$\Delta\varphi[n+1] = \varphi[n+1] - \varphi*[n+1] \tag{49}$$

By using (48) (for the half cycle [n+1]) and (46), the following relationship is derived:

$$\frac{-i[n+2]+i[n]}{T_s/2} = (m_1 - m_2)(\Delta\varphi[n] + \Delta\varphi[n+1]) \tag{50}$$

Eq'n. 50 is valid when i[n+2]<i[n+1] or i[n]<i[n+1]. The same relationship for i[n+2]>i[n+1] or i[n]>i[n+1] can be derived by using (48) for the half cycle [n−1] (n=n−1) and (46), as follows:

$$\frac{i[n+2] - i[n]}{T_s/2} = (m_1 - m_2)(\Delta\varphi[n] + \Delta\varphi[n+1]) \quad (51)$$

The rate of change between the current samples is defined based on the difference between the current samples at the beginning of the first half cycle and the end of the consecutive half cycle (i.e. i[n+2] and i[n]) as:

$$\frac{di[n]}{dt} = \frac{i[n+2] - i[n]}{T_s} \quad (52)$$

By using (47), (29), and (52) in (50) and (51), the rate of change for the current samples is derived as:

$$\frac{di[n]}{dt} = \begin{cases} \frac{-kV_b}{L_s}(\Delta\varphi[n] + \Delta\varphi[n+1]) & i[n] < i[n+1] \\ \frac{kV_b}{L_s}(\Delta\varphi[n] + \Delta\varphi[n+1]) & i[n] > i[n+1] \end{cases} \quad (53)$$

Eq'n. (53) shows the impact of φ on the value of current samples for the consecutive half cycles [n] and [n+1].

The current error (Δi[n]) is defined as:

$$\Delta i[n] = \begin{cases} i_{ref} + i[n] & i[n] < i[n+1] \\ i_{ref} - i[n] & i[n] > i[n+1] \end{cases} \quad (54)$$

where $i_{ref}$ is the current reference. Thus, the rate of change of the current error is given by:

$$\frac{d\Delta i[n]}{dt} = \frac{\Delta i[n+2] - \Delta i[n]}{T_s} = \begin{cases} \frac{+di[n]}{dt} & i[n] < i[n+1] \\ \frac{-di[n]}{dt} & i[n] > i[n+1] \end{cases} \quad (55)$$

Eq'n. 55 can be rewritten as:

$$\frac{di[n]}{dt} = \begin{cases} \frac{d\Delta i[n]}{dt} & i[n] < i[n+1] \\ \frac{-d\Delta i[n]}{dt} & i[n] > i[n+1] \end{cases} \quad (56)$$

By substituting (56) into (53), the following difference equation is derived for every two consecutive half cycles:

$$\frac{d\Delta i[n]}{dt} = \frac{-kV_b}{L_s}(\Delta\varphi[n] + \Delta\varphi[n+1]) \quad (57)$$

The control system is designed such that $$\frac{d\Delta i[n]}{dt}$$

(the error) approaches zero by controlling φ[n].

Figure 12:
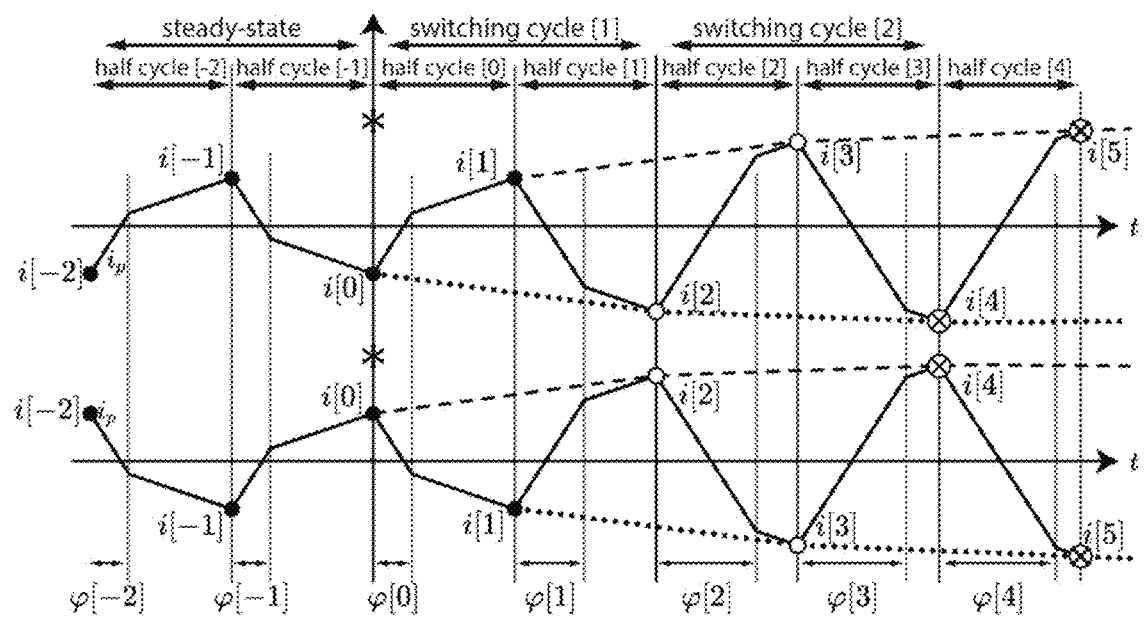
FIG. 12 is a plot showing a dynamic response of the DAB converter according to the present invention.

FIG. 12 depicts the exemplary dynamic response of the DAB converter when the GSC scheme of the present invention is used to control φ. According to this figure, the converter is initially operating at steady-state $$\left(\frac{d\Delta i[n]}{dt} = 0\right).$$

Then, at the beginning of the half cycle [0], there is a step change in $i_{ref}$ (the new value of $i_{ref}$ is illustrated by an asterisk sign (*) in the figure). The responses of the GSC scheme when the current value at the beginning of the half cycle is positive are shown at the top of FIG. 12. The responses when the current value at the beginning of the half cycle is negative are shown at the bottom of FIG. 12. As can be seen, the GSC method for this aspect of the present invention creates a half cycle delay in response to the step change. That is, φ[0]=φ[−1]=φ[−2] and i[−2]=i[−1]=i[0]=i [1]. In the next half cycle (half cycle [1]), the GSC changes φ[1] according to its specific control law, and in turn |i[1]|<|i[2]|. In the half cycle [2], the GSC changes φ[2] such that |i[3]|=|i[2]|. This procedure is continued until |i[n]| is rendered zero. That is, in odd half cycles (half cycle [n=2m+1], where m is a natural number), |i[2m+1]|<|i[2m+2]| and in even half cycles (half cycle [n=2m], where m is a natural number), $$\begin{cases} |i[2m+1]| = |i[2m]| \\ \Delta i[2m+1] = \Delta i[2m] \end{cases} \quad (58)$$

Thus, the magnitude of the sampled current at the end of the even half cycles [n=2m] is equal to its beginning, which concludes:

$$\begin{cases} \varphi[2m] = \varphi^*[2m] = \varphi^*[2m+1] \\ \Delta\varphi[2m] = 0 \end{cases} \quad (59)$$

The dashed line in FIG. 12 shows the trajectory of the odd and even sampled currents in their transition towards the magnitude of $i_{ref}$ and steady-state operation. In the GSC approach, error reduces by half in every switching cycle. Hence:

$$\Delta i[n+2] = 0.5\Delta i[n] \quad (60)$$

Eq'n (60) results in a fast transient response. A faster response is possible by simply changing the 0.5 factor in Eq'n 60 to any value between 0.5 and 1. However, note that changing this factor may compromise seamless transitions in the dynamic operation. Accordingly, the factor of 0.5 may be preferable, as achieving a balance between fast response and smooth transitions.

Accordingly, for the present invention, the GSC control law for PSM (given by (44)) can be derived based on Eq'ns. (58), (59) and (60). By using (60) and (55), $\frac{d\Delta i[n]}{dt}$ is given by:

$$\frac{d\Delta i[n]}{dt} = \frac{\Delta i[n+2] - \Delta i[n]}{T_s} = -0.5\frac{\Delta i[n]}{T_s} \quad (61)$$

Then, by inserting (61) into (57), the following relationship is derived for each half cycle:

$$0.5\frac{\Delta i[n]}{T_s} = \frac{kV_b}{L_s}(\Delta\varphi[n] + \Delta\varphi[n+1]) \quad (62)$$

Eq'n. (62) for even half cycles results in:

$$0.5\frac{\Delta i[2m]}{T_s} = \frac{kV_b}{L_s}(\Delta\varphi[2m] + \Delta\varphi[2m+1]) \quad (63)$$

By rearranging (63), $\Delta\varphi$ for odd half cycles is achieved as (from (59), $\Delta\varphi[2m]=0$):

$$\Delta\varphi[2m+1] = 0.5\frac{f_s L_s}{kV_b}\Delta i[2m] \quad (64)$$

Eq. (62) results in the same relationship as (64) for odd half cycles. By using (45) when n=2m+1 in (64), the following relationship is derived:

$$\varphi[2m+1] - \varphi^*[2m+1] = 0.5\frac{f_s L_s}{kV_b}\Delta i[2m] \quad (65)$$

The control law is derived for odd half cycles by using (59) in (65), as follows:

$$\varphi[2m+1] = 0.5\frac{f_s L_s}{kV_b}\Delta i[2m] + \varphi[2m] \quad (66)$$

Figure 13:
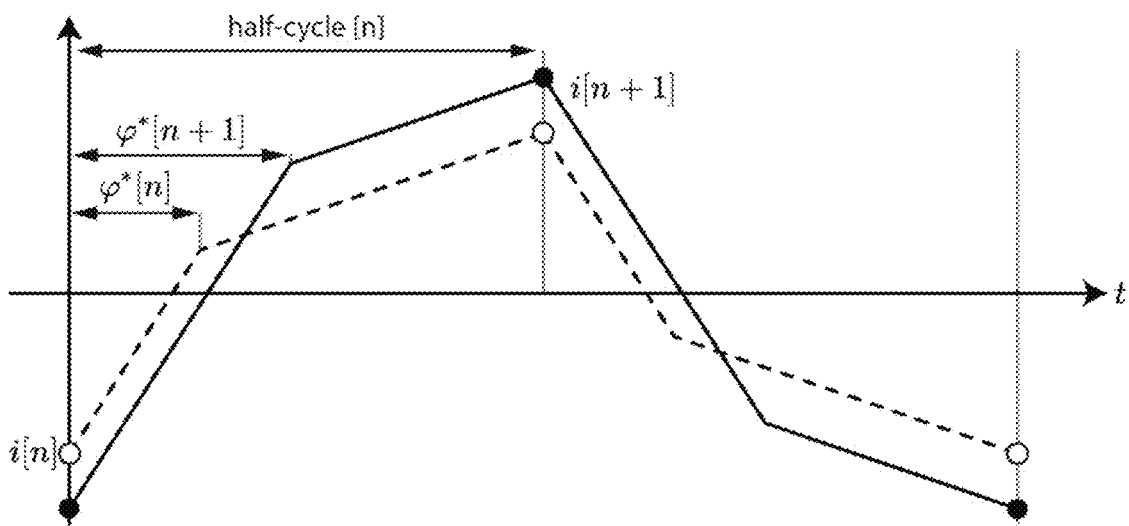
FIG. 13 is a plot showing steady-state current waveforms associated with current and phase shift.

The control law for even half cycles is derived similarly. To this end, a relation between $\varphi^*[n]$, $\varphi^*[n+1]$, and $\Delta\varphi[n]$ is beneficial. FIG. 13 depicts the steady-state current waveforms associated with $\varphi^*[n]$ and $\varphi^*[n+1]$. The magnitude of all the sampled currents that correspond to $\varphi^*[n]$ is equal to and the magnitude of all the sampled currents that correspond to $\varphi^*[n+1]$ is equal to $|i[n+1]|$. Since these waveforms are at steady-state, (8) can be used to find $|i[n]|$ and $[|i[n+1]|]$:

$$\frac{|i[n]|}{T_s/2} = \frac{1}{L_s}((+0.5)V_a + (\varphi^*[n] - 0.5)kV_b) \quad (67)$$

$$\frac{|i[n+1]|}{T_s/2} = \frac{1}{L_s}((+0.5)V_a + (\varphi^*[n+1] - 0.5)kV_b) \quad (68)$$

Then, by subtracting (67) from (68), $$\frac{|i[n+1]| - |i[n]|}{T_s/2} = \frac{kV_b}{L_s}(\varphi^*[n+1] - \varphi^*[n]) \quad (69)$$

An important property of DAB converters operating in PSM can be derived by combining (46), (48), and (69) as follows:

$$2\Delta\varphi[n] = \varphi^*[n+1] - \varphi^*[n] \quad (70)$$

That is, the error in a conventional DAB converter, without a GSC control system implemented, grows according to Eq'n. (70).

Eq. (70) for n=2m+1 yields:

$$\varphi^*[2m+1] + \Delta\varphi[2m+1] = \varphi^*[2(m+1)] - \Delta\varphi[2m+1] \quad (71)$$

Combining Eq'n. (45) for n=2m+1, (64), (58), (59), and (71), the following GSC control law for PSM can be derived for even half cycles as follows:

$$\varphi[2m'] = \varphi[2m'-1] + 0.5\frac{f_s L_s}{kV_b}\Delta i[m'-1] \quad (72)$$

where m'=m+1. Thus, using (66) and (72), the general form of the GSC control law for PSM is derived as:

$$\varphi[n] = 0.5\frac{L_s f_s}{kV_b}\Delta i[n-1] + \varphi[n-1] \quad (73)$$

The performance of the GSC control is evaluated when there is DC current in the transformer winding during transients. (The DC current is defined as the average of the current for a switching cycle.) The DC current is the result of asymmetry in the current waveform. The asymmetry can occur in six ways, as depicted in FIGS. 14A to 14F. In all cases, the magnitude of $|i_1|$ is different from $|i_0|$. In order to remove the DC current, the asymmetry between the positive and negative half cycles in current waveform must be eliminated. The GSC scheme ensures that the sampled currents at the beginning of even half cycles ($i_{2m}$) approach $-i_{ref}$ and the sampled currents at the beginning of odd half cycles ($i_{2m+1}$) approach $+i_{ref}$ for all six cases. Thus, the GSC scheme effectively eliminates any asymmetry in the current waveform and renders the DC current zero. In FIGS. 14A to 14F, the sampled currents of even half cycles can have three different states as follows:

$$\begin{cases} i[2m] = i[2m+2] & \text{if } \varphi[2m+1] = \varphi[2m] \\ i[2m] < i[2m+2] & \text{if } \varphi[2m+1] > \varphi[2m] \\ i[2m] > i[2m+2] & \text{if } \varphi[2m+1] < \varphi[2m] \end{cases} \quad (74)$$

From the GSC control law:

$$\varphi[2m+1] - \varphi[2m] = 0.5\frac{L_s f_s}{kV_b}\Delta i[2m].$$

Therefore, the states in Eq'n (74) can be rewritten as:

$$\begin{cases} i[2m] = i[2m+2] & \text{if } i[2m] = -i_{ref} \\ i[2m] < i[2m+2] & \text{if } i[2m] < -i_{ref} \\ i[2m] > i[2m+2] & \text{if } i[2m] > -i_{ref} \end{cases} \quad (75)$$

A similar procedure is used to find the three different states for the sampled currents of odd half cycles as follows:

$$\begin{cases} i[2m+1] = i[2m+3] & \text{if } i[2m+1] = i_{ref} \\ i[2m+1] < i[2m+3] & \text{if } i[2m+1] < i_{ref} \\ i[2m+1] > i[2m+3] & \text{if } i[2m+1] > i_{ref} \end{cases} \quad (76)$$

Table 3 shows that i[2m] approaches $-i_{ref}$ and i[2m+1] approaches $i_{ref}$ for all six cases in FIG. 14. Note that this is only the case when the sampled current is delayed by a half cycle ($\Delta i[n]$). If the sample current is not delayed; that is, if ($\Delta i[n]$) is not used in the GSC formulas, then i[n] will not converge to the reference currents for all six states. Moreover, some states will act as a feed-forward, causing $i_p$ to diverge.

TABLE 3

Figure 14A:
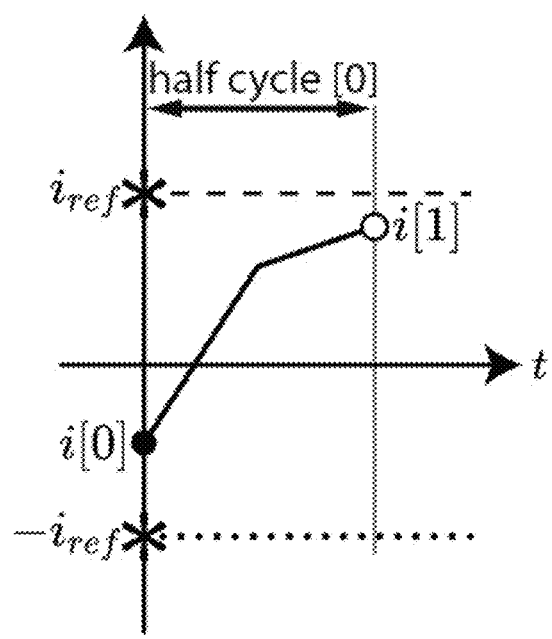
FIGS. 14A to 14F are plots showing asymmetric waveforms.
Figure 14B:
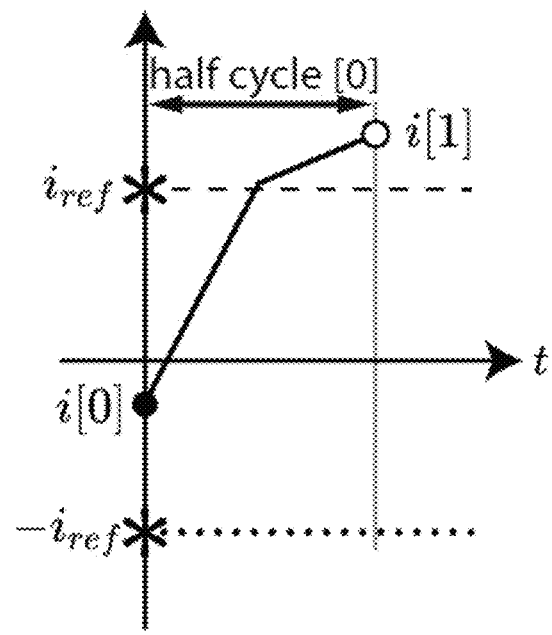
Figure 14C:
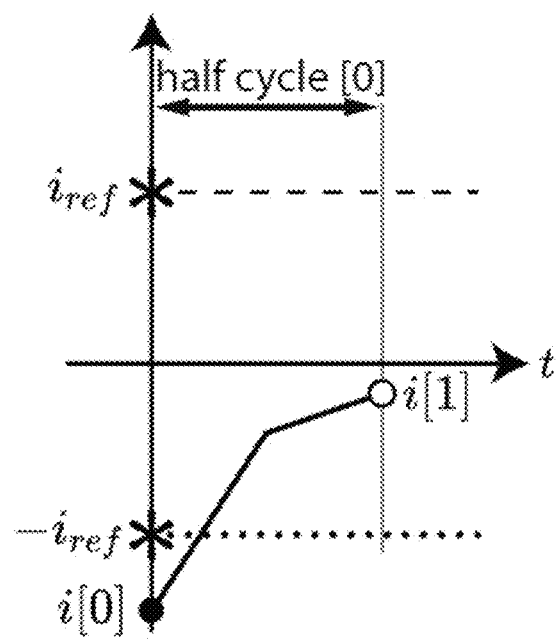
Figure 14D:
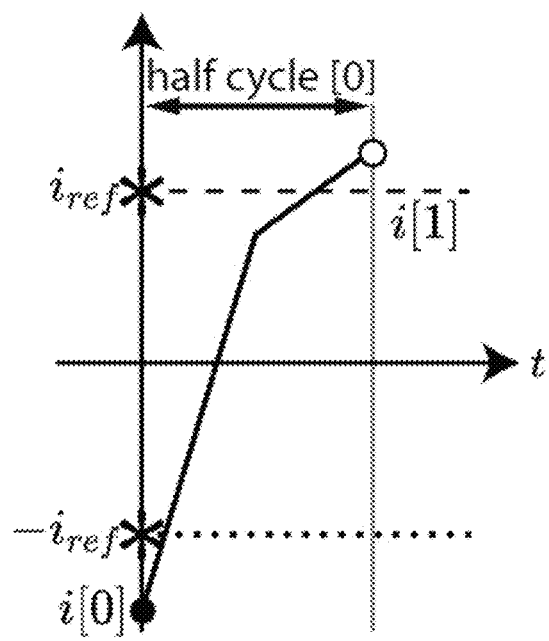
Figure 14E:
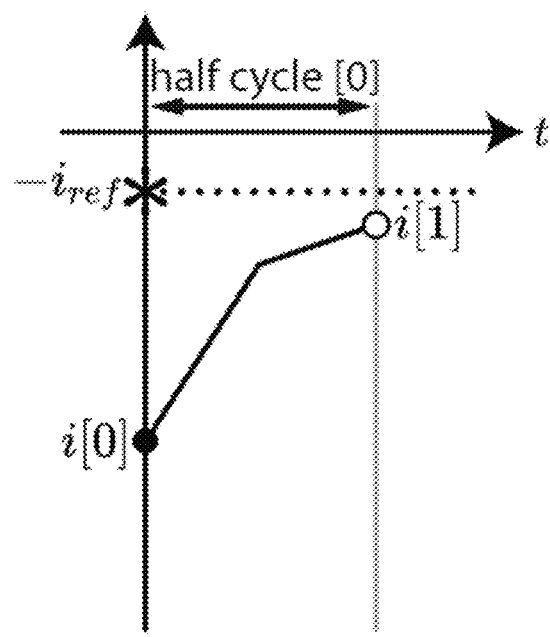
Figure 14F:
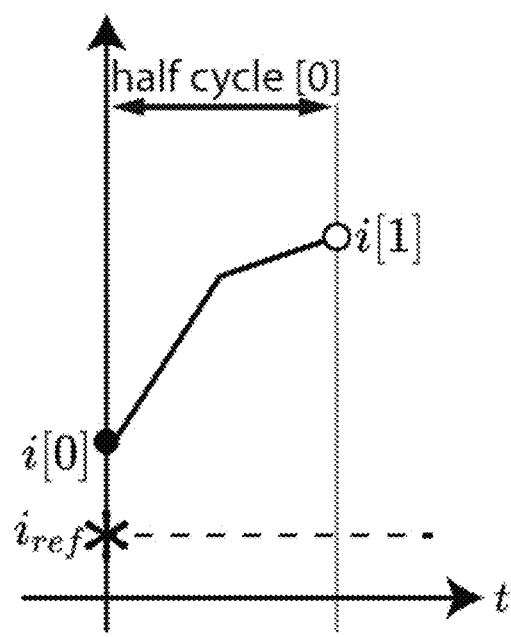

| case | condition | i[2m] | condition | i[2m + 1] |
|---|---|---|---|---|
| FIG. 14A | i[0] > −$i_{ref}$ | decreases | i[1] < $i_{ref}$ | increases |
| FIG. 14B | i[0] > −$i_{ref}$ | decreases | i[1] > $i_{ref}$ | decreases |
| FIG. 14C | i[0] < −$i_{ref}$ | increases | i[1] < $i_{ref}$ | increases |
| FIG. 14D | i[0] < −$i_{ref}$ | increases | i[1] > $i_{ref}$ | decreases |
| FIG. 14E | i[0] < −$i_{ref}$ | increases | i[1] < $i_{ref}$ | increases |
| FIG. 14F | i[0] > −$i_{ref}$ | decreases | i[1] > $i_{ref}$ | decreases |

Derivation of GSC for VDM

Figure 15A:
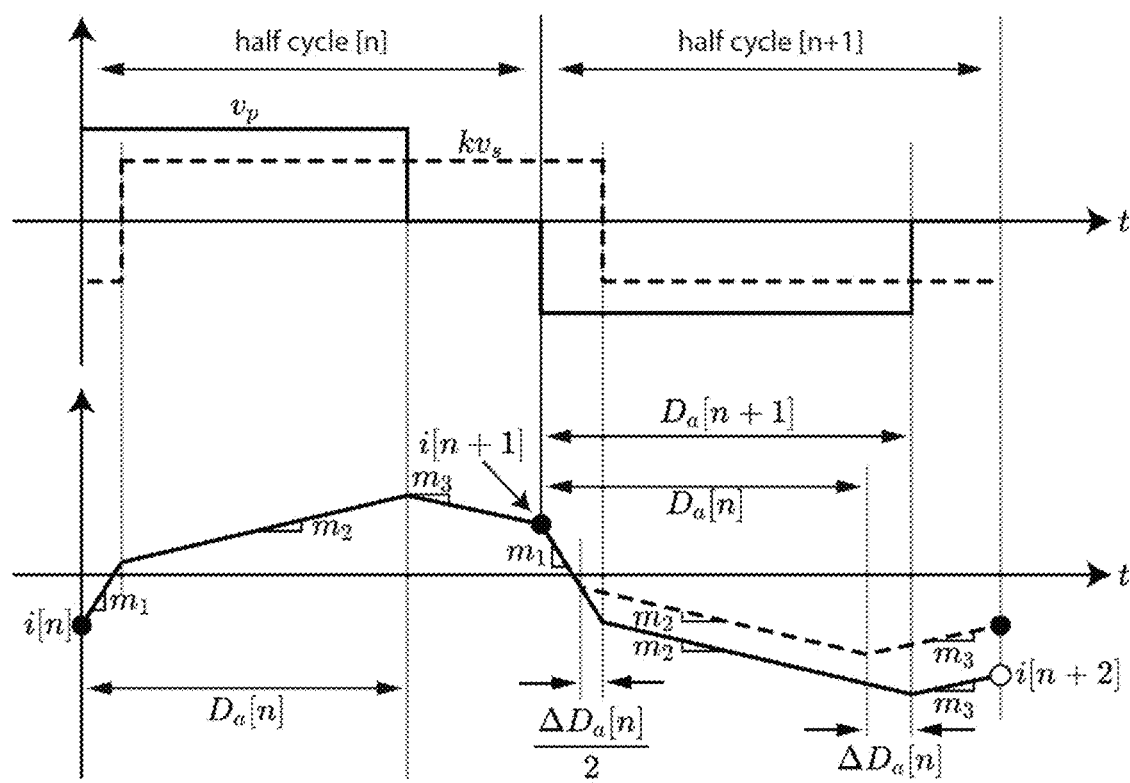
FIGS. 15A and 15B are plots showing $i_p$ with different duty cycles of Bridge A at each half cycle.
Figure 15B:
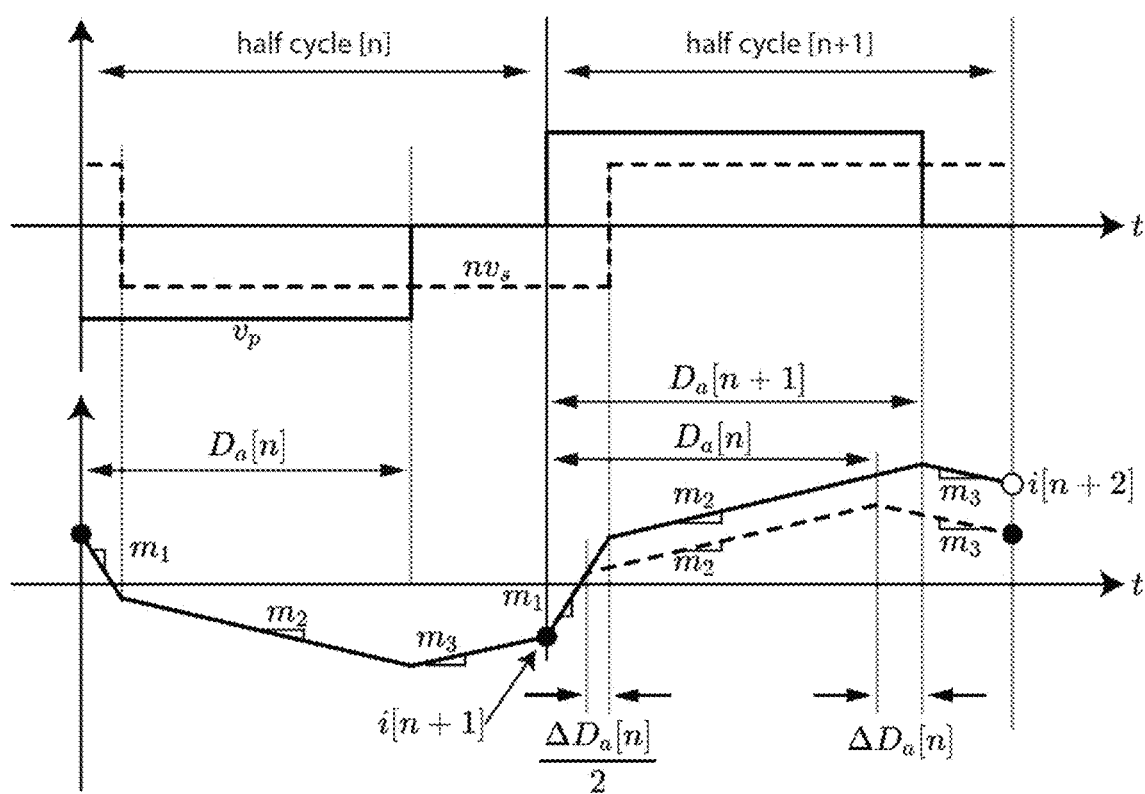

FIGS. 15A and 15B depict the deviation of $i_p$ in the VDM scheme in one switching cycle (i.e., different $D_a$s for each half cycle) when $v_a > kv_b$. Since $v_a > kv_b$, $D_a$ is used as the control variable, the time intervals $t_1$ and $t_2$ must be varied by $\Delta D_a[n+1]/2$ so that φ and $D_b$ remain constant, when $D_a[n+1]$ changes by $\Delta D_a[n]$. (This relation can be inferred from (11), (12), (13)). As shown in FIGS. 15A and 15B, the currents are sampled at i[n], i[n+1], and i[n+2], which correspond to the instants when $v_p$ changes from zero to $+v_a$ or $-v_a$. Additionally, i[n+2]=i[n] when $D_a[n+1]=D_a[n]$.

FIG. 15A shows that, by increasing $D_a$, [n+1], i[n+2] also increases. For this figure, the following relationship can be derived:

$$\frac{i[n] - i[n+2]}{T_s} = (m_2 - m_3)\Delta D_a[n] + (m_1 - m_3)D[n] \text{ where} \quad (77)$$

$$\Delta D_a[n] = D_a[n+1] - D_a[n] \quad (78)$$

Then, by using (47), (29), (52), (30), and (77), the following relationship is derived:

$$\frac{-di[n]}{dt} = \frac{V_a + kV_b}{L_s}\Delta D_a[n] \quad (79)$$

In FIG. 15B, i[n+2] decreases as $D_a$, [n+1] increases, and if $D_a$, [n]=$D_a$, [n+1], then i[n+2]=i[n]. The current derivative may be written as follows:

$$\frac{di[n]}{dt} = \frac{V_a + kV_b}{L_s}\Delta D_a[n] \quad (80)$$

Then, by using (56), (79), and (80) the following difference equation can be achieved:

$$\frac{d\Delta i[n]}{dt} = -\frac{V_a + kV_b}{L_s}\Delta D_a[n] \quad (81)$$

By using (60) and (81), the GSC control law for VDM when $v_a > kv_b$ is derived as:

$$\frac{0.5\Delta i[n]}{dt} = \frac{V_a + kV_b}{L_s}\Delta D_a[n] \quad (82)$$

$$D_a[n+1] = \frac{0.5L_s f_s}{V_a + kV_b}\Delta i[n] + D_a[n] \quad (83)$$

Figure 16A:
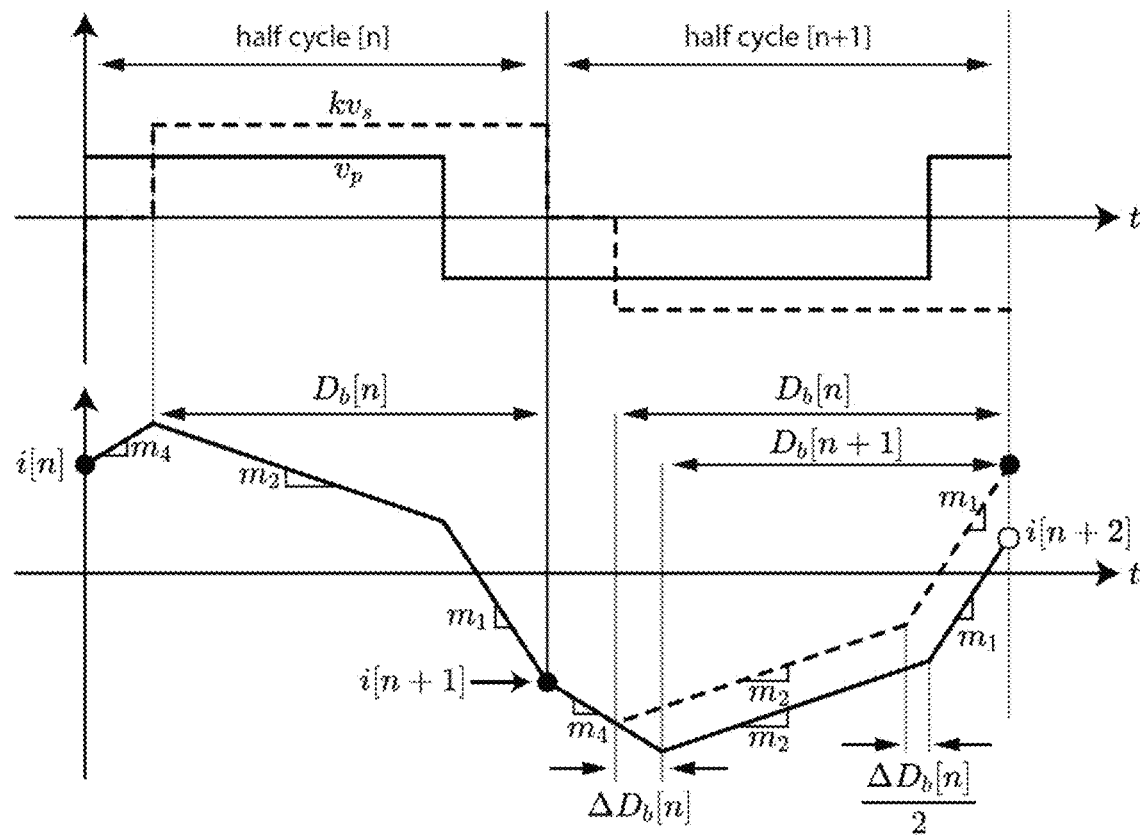
FIGS. 16A and 16B are plots showing $i_p$ with different duty cycles of Bridge B at each half cycle.
Figure 16B:
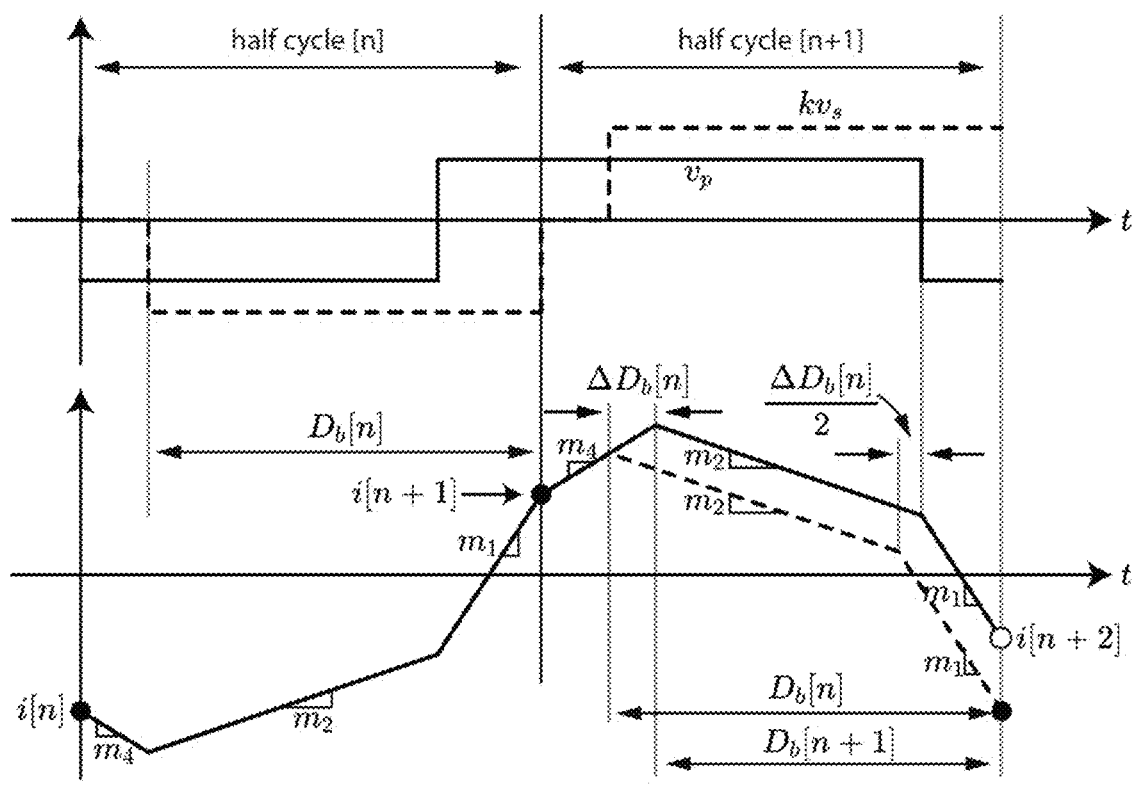

FIGS. 16A and 16B depict the deviation of $i_p$ for the VDM scheme in one switching cycle (i.e., different $D_b$s for each half cycle) when $v_a < kv_b$. Again, the time intervals $t_1$ and $t_2$ must be varied by $\Delta D_a[n+1]/2$ so that φ and $D_a$ remain constant when $D_b$ [n+1] changes by $\Delta D_b[n]$. The currents are sampled at i[n], i[n+1], and i[n+2], which correspond to the the instants when $kv_s$ changes from $+kv_b$ or $-kv_a$ to zero. Additionally, when $D_a[n+1]=D_a[n]$, i[n+2]=i[n].

FIG. 16A shows that, by decreasing $D_b[n+1]$, i[n+2] also decreases, representing the following relationship:

$$\frac{i[n] - i[n+2]}{T_s} = (m_4 - m_2)\Delta D_a[n] + (m_1 + m_2)D_a[n] \text{ where} \quad (84)$$

$$\Delta D_b[n] = D_b[n+1] - D_b[n] \quad (85)$$

By using (47), (29), (52), (31), and (84), the current derivative can be calculated as:

$$\frac{-di[n]}{dt} = \frac{V_a + kV_b}{L_s}\Delta D_b[n] \quad (86)$$

In FIG. 16B, i[n+2] increases as $D_a[n+1]$ decreases, and if $D_a[n]=D_a[n+1]$, then i[n+2]=i[n]. The current derivative can be written as:

$$\frac{di[n]}{dt} = \frac{V_a + kV_b}{L_s}\Delta D_b[n] \quad (87)$$

Then, using (56), (86), and (87) the following difference equation is derived:

$$\frac{d\Delta i[n]}{dt} = -\frac{V_a + kV_b}{L_s}\Delta D_b[n] \quad (88)$$

By using (60) and (88), the GSC control law for VDM when $v_a < kv_b$ is given by:

$$\frac{0.5\Delta i[n]}{dt} = \frac{V_a k V_b}{L_s}\Delta D_b[n] \quad (89)$$

$$D_b[n+1] = \frac{0.5 L_s f_s}{V_a + k V_b}\Delta i[n] + D_b[n] \quad (90)$$

Derivation of GSC for TCM

Figure 17A:
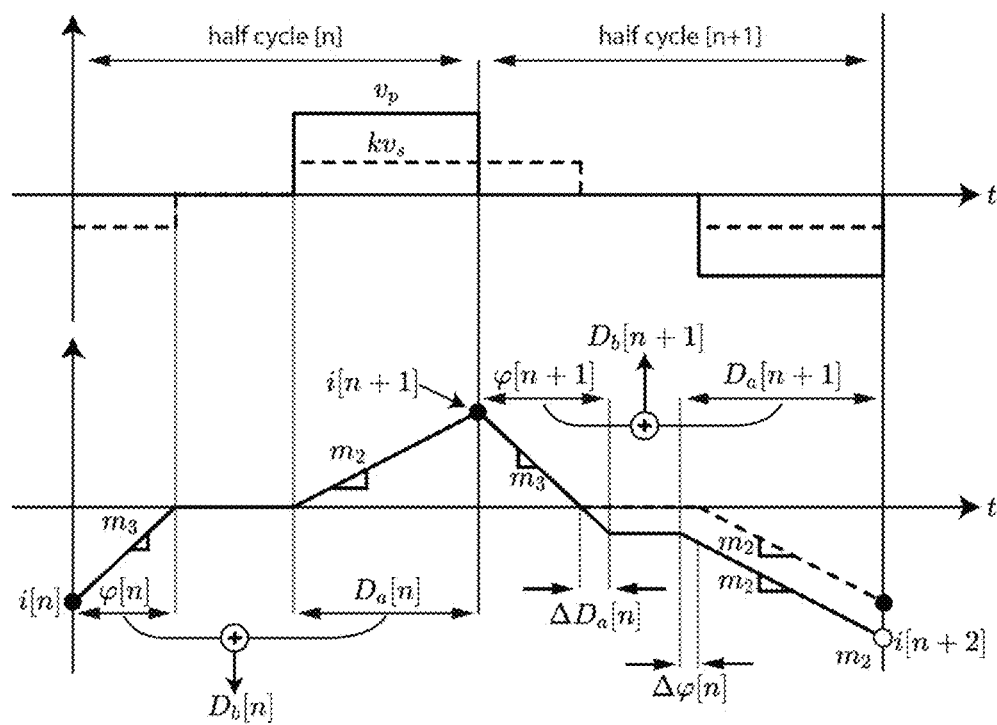
FIGS. 17A and 17B are plots showing $i_p$ with different $\varphi[n]$ s for each half cycle when $v_a > kv_b$.
Figure 17B:
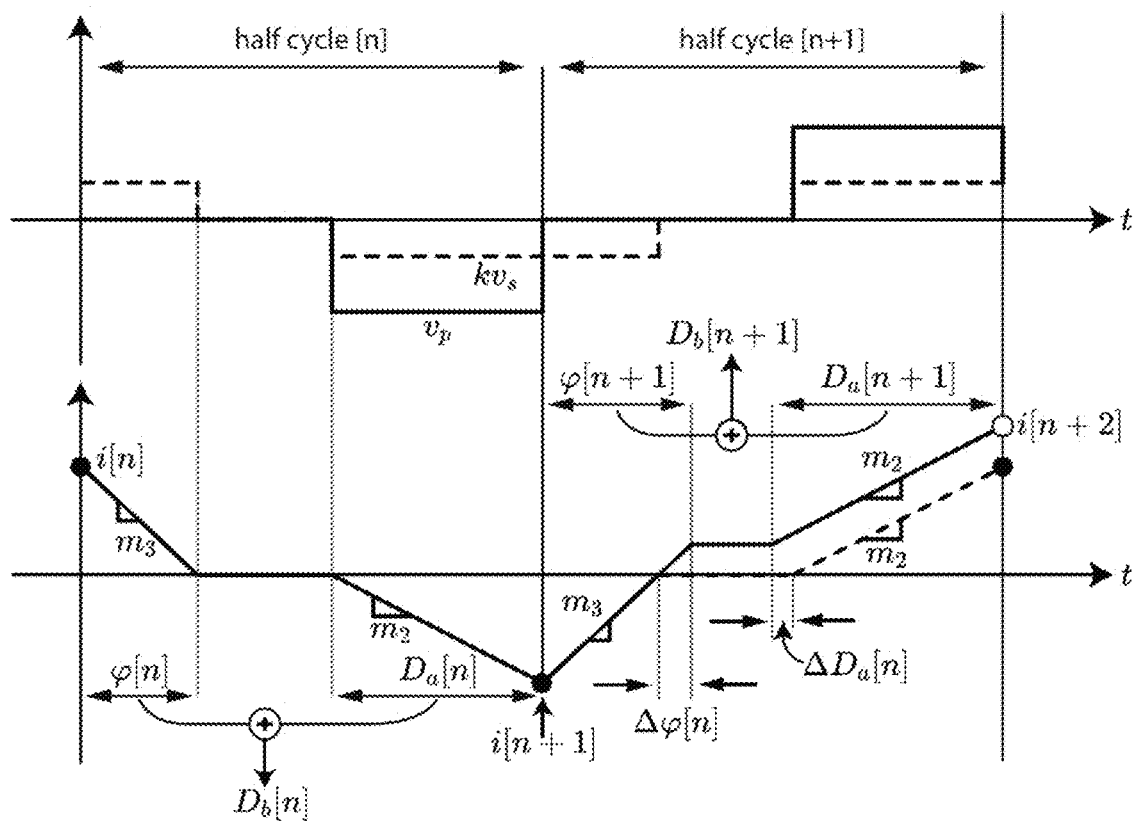

FIGS. 17A and 17B depict the deviation of $i_p$ for the TCM scheme in one switching cycle (i.e., different φ[n]s for each half cycle) when $v_a > k v_b$. The currents are sampled at i[n], i[n+1], and i[n+2], which correspond to the instants when $v_p$ changes from $+v_a$ or $-v_a$ to zero. Again, i[n+2]=i[n] when $D_a$, [n+1]=$D_a$[n]. FIG. 17A shows that by increasing φ[n+1], i[n+2] decreases and the following relationship can be derived:

$$\frac{i[n] - i[n+2]}{T_s} = -m_3\Delta\varphi_\Delta[n] + m_2\Delta D_a[n] = -2m_3\Delta\varphi_\Delta[n] \quad (91)$$

where $$\Delta\varphi_\Delta[n] = \varphi[n+1] - \varphi[n] \quad (92)$$

By using (52), (30), (91), and (92), the current derivative is calculated as:

$$\frac{-di[n]}{dt} = \frac{2kV_b}{L_s}\Delta\varphi_\Delta[n] \quad (93)$$

In FIG. 17B, i[n+2] increases as φ[n+1] increases, and if φ[n]=φ[n+1], then i[n+2]=i[n]. The current derivative can be written as:

$$\frac{di[n]}{dt} = \frac{2kV_b}{L_s}\Delta\varphi_\Delta[n] \quad (94)$$

By using (56), (91), and (94), the following difference equation can be determined:

$$\frac{d\Delta i[n]}{dt} = -\frac{2kV_b}{L_s}\Delta\varphi_\Delta[n] \quad (95)$$

By using (60) and (95), the GSC control law for TCM when $v_a > k v_b$ can be derived as follows:

$$\frac{0.5\Delta i[n]}{dt} = \frac{2kV_b}{L_s}\Delta\varphi_\Delta[n] \quad (96)$$

$$\varphi[n+1] = \frac{0.5 L_s f_s}{2kV_b}\Delta i[n] + \varphi[n] \quad (97)$$

Figure 18A:
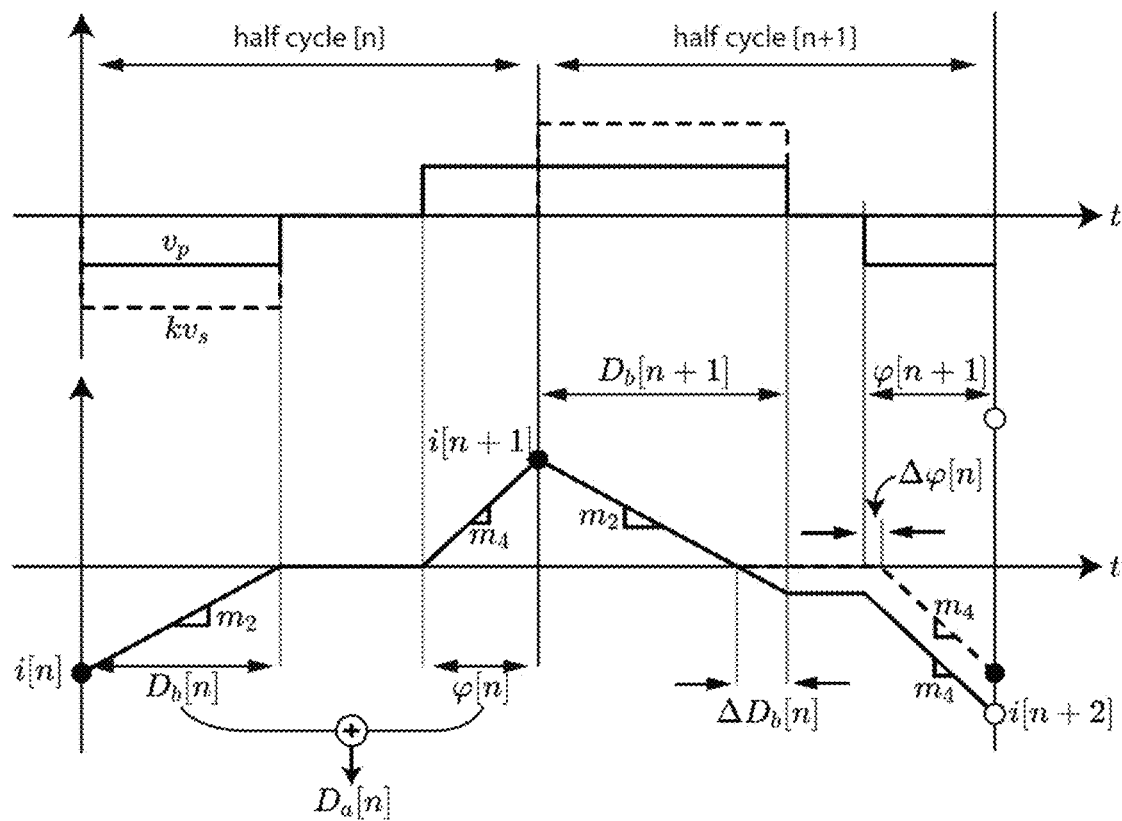
FIGS. 18A and 18B are plots showing $i_p$ with different $\varphi[n]$ s for each half cycle when $v_a < kv_b$.
Figure 18B:
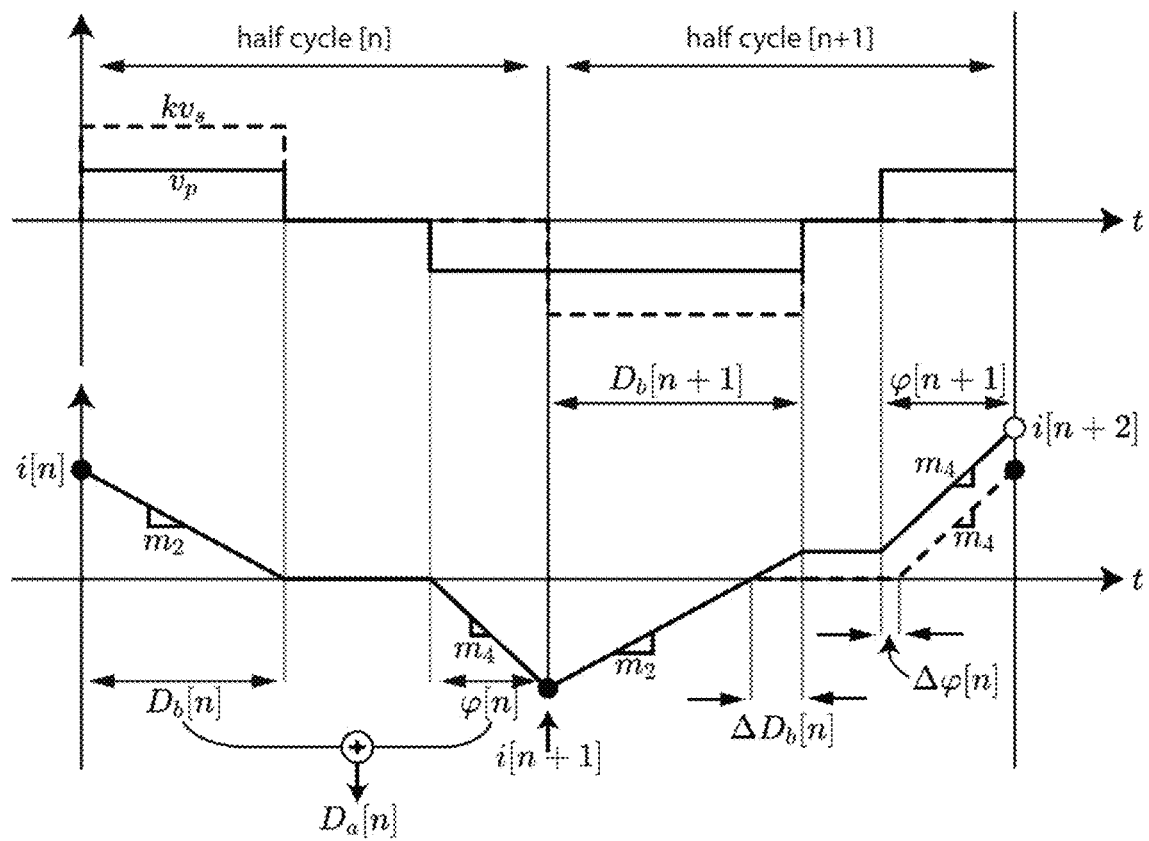

FIGS. 18A and 18B depict the deviation of $i_p$ for the TCM scheme in one switching cycle (i.e., different φ[n]s for each half cycle) when $v_a < k v_b$. The currents are sampled at i[n], i[n+1], and i[n+2], which correspond to the instants when $kv_b$ changes from zero to $+kv_b$ or $-kv_b$. Again, i[n+2]=i[n] when $D_a$[n+1]=$D_a$[n]. FIG. 18A shows that by increasing φ[n+1], i[n+2] decreases. The following relationship can be derived:

$$\frac{i[n] - i[n+2]}{T_s} = m_4\Delta\varphi_\Delta[n] + m_2\Delta D_b[n] = 2m_4\Delta\varphi_\Delta[n] \quad (98)$$

By using (52), (30), (98), and (92), the current derivative is calculated as:

$$\frac{-di[n]}{dt} = \frac{2V_a}{L_s}\Delta\varphi_\Delta[n] \quad (99)$$

In FIG. 18B, i[n+2] increases as φ[n+1] increases and if φ[n]=φ[n+1], then i[n+2]=i[n]. The current derivative can then be written as:

$$\frac{di[n]}{dt} = \frac{2V_a}{L_s}\Delta\varphi_\Delta[n] \quad (100)$$

By using (56), (99), and (100), the following difference equation is given:

$$\frac{d\Delta i[n]}{dt} = -\frac{-2V_a}{L_s}\Delta\varphi_\Delta[n] \quad (101)$$

By using (60) and (101), the GSC control law for TCM when $v_a < k v_b$ can be derived as:

$$\frac{0.5\Delta i[n]}{dt} = \frac{2V_a}{L_s}\Delta\varphi_\Delta[n] \quad (102)$$

$$\varphi[n+1] = \frac{0.5 L_s f_s}{2V_a}\Delta i[n] + \varphi[n] \quad (103)$$

Stability and Robustness of the GSC Control System

The well-known Lyapunov function can be used to investigate stability and robustness of differential equations. In the current case, the Lyapunov function is defined as:

$$V = \Delta i_{p,t_0}^2[k] \quad (104)$$

Additionally, note that the control laws given above can be derived based on Eq'n (61). Therefore, the following relationship in the current error holds when GSC control is used:

$$\Delta i[n+1] = 0.5\Delta i[n] \quad (105)$$

The difference of the Lyapunov function can then be derived as follows:

$$V[n] - V[n-1] = \Delta i^2[n] - \Delta i^2[n-1] \quad [106]$$
$$= (0.5\Delta i[n])^2 - \Delta i^2[n-1]$$
$$= -0.75\Delta i^2[n]$$

which shows that V[n]−V[n−1] is always negative. Therefore, Δi is asymptotically stable at origin, meaning Δi converges to zero at steady-state.

In practice, there may be uncertainties in the system. As an example, the value of external series inductance might vary during different operations. Also, the voltage measurement of the DC bus might have some deviation from its real value. A robust control system preferably provides stability even in light of such uncertainties and fluctuations. The GSC control laws of the present invention depend on the transformer ratio, output voltage, switching period, and the series inductance. By taking into account the percentage error of the series inductance ($\Delta L_s \%$), the relation between the two consecutive errors can be derived as follows:

$$\Delta i_p[k+1]=(0.5-0.50L_s\%)\Delta i_p[k] \quad (107)$$

Rewriting the difference equation for the Lyapuov function thus yields:

$$V[k]-V[k-1]=\tfrac{1}{4}(\Delta L_s\%^2-2\Delta L_s\%-3)\Delta i_{p,t_0}^2[k] \quad (108)$$

The above equation is negative if $$-100\%<\Delta L_s\%<300\%\rightarrow -L_s<\Delta L_s<3L_s \quad (109)$$

Therefore, if the perturbations of $L_s$ are within the range in Eq'n (109), the control system is still asymptotically stable. Similar results can be achieved for variations in switching frequency.

The perturbation in sensing the DC bus voltage can be investigated by taking into account the percentage error ($\Delta V \%$) when sensing the DC bus voltage. The relationship between the two consecutive errors can be derived as follows:

$$\Delta i_p[k+1] = \left(1 - \frac{0.5}{1+\Delta v_b\%}\right)^2 \Delta i_p[k] \quad (110)$$

leading to the following Lyapunov function:

$$V[k] - V[k-1] = \left(\left(1 - \frac{0.5}{1+\Delta v_b\%}\right)^2 - 1\right)\Delta i_{p,t_0}^2[k] \quad (111)$$

The above equation is negative if $$-75\%<\Delta v_b\rightarrow \quad (112)$$

$$-0.75 v_b < \Delta v_b \quad (113)$$

Therefore, if the perturbations of $v_b$ are compliant with the range in (113), then the control system is asymptotically stable. Thus, the GSC control system of the present invention illustrates high robustness against system uncertainties and fluctuations in the system.

The stability and robustness of the GSC control law for a general case with different scale factors ($\lambda$) can be written $$\Delta i[n]=(1-\lambda)\Delta i[n-1] \quad (114)$$

Following a similar procedure as that above for the scale factor of $\lambda=0.5$, it can be derived that when the scale factor is within $0<\lambda<2$, the error reduces in a geometric sequence progression towards zero with common ratio of $1-\lambda$.

SIMULATION AND EXAMPLE

The performance of the control system according to one aspect of the present invention was verified by simulation results, using the prototype of FIG. 2. Again, as should be clear, nothing in this example simulation should be taken as limiting the invention in any way.

PSIM™ simulation software was used to conduct simulations for a DAB DC/DC converter with specifications given in Table 4.

TABLE 4

| Symbol | Parameter | Value |
|---|---|---|
| $V_a$ | Input Voltage | 100 $V_{DC}$ |
| $V_b$ | Output Voltage | 150 $V_{DC}$ |
| $f_s$ | Switching Frequency | 100 kHz |
| $L_s$ | Series Inductor | 10 μH |
| $C_A$ | Input Capacitance | 160 μF |
| $C_B$ | Output Capacitance | 160 μF |
| n | Transformer's Turns Ratio | 0.9 |
| S | MOSFETs | SQM10250E_GE3 |

As an example, the control system was implemented inside a Cyclone™ IV FPGA (field-programmable gate array). VHSIC Hardware Description Language was used to program the FPGA. A phase-locked loop block ("PLL block) inside the FPGA was used to boost the clock of the external oscillator from 24 MHz to 120 MHz. The block diagram of FIG. 2 shows a power flow from port A to port B. The analogue-to-digital (ADC) devices used were ADS7884™ devices. The current transformer used was PN: P0581N, optimized for frequencies of 50-500 kHz. The corresponding ADC for $i_p[n]$ performs sampling every half cycle. This timing is controlled by a sampling signal (ss) which is generated inside the modulator based on the values in Table 4. ADS7884™ devices are capable of sampling 3 MSPS, and thus can support the required half cycle (200 kSPS) sensing for the $i_p$ value. The sampled currents were kept for every three consecutive half cycles of (i[n]). Based on this calculated power level, the modulator also operates in three different modes: TCM, VDM, and PSM. These modulation schemes were constructed using a Mealy state machine.

It should, however, be clear that the digital control system as explained above may be implemented using various platforms such as FPGA, digital signal processors ("DSP"), and others.

Figure 19A:
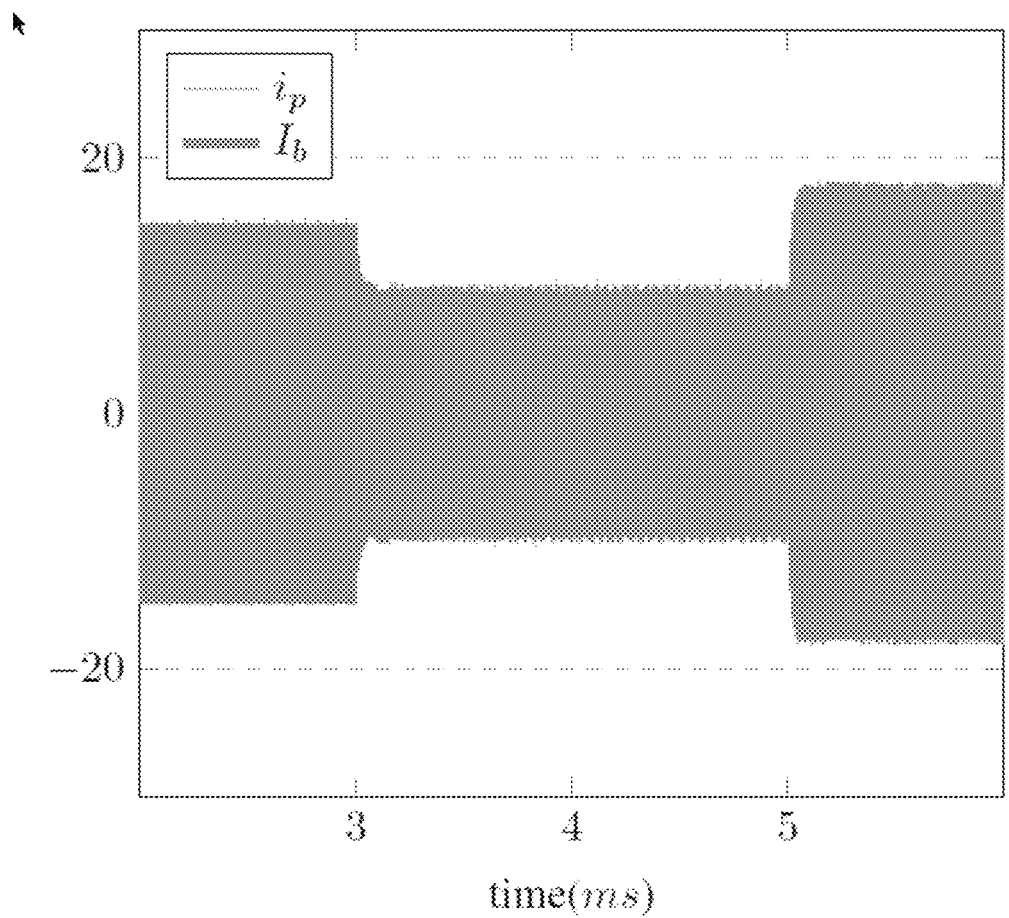
FIGS. 19A to 19D depict the transient response of the control system of FIG. 2.

FIGS. 19A to 19D depicts the transient response of the GSC control system. Specifically, FIG. 19A depicts the current waveforms $i_p$ and $I_b$ for a positive and negative step change in the inner loop reference current. At t=3 ms, the reference current is changed such that $i_b$ changes from 9 A to 6 A. Then, at t=5 ms, the reference current is changed such that $i_b$ changes from 6 A to 10 A. In both cases, $i_p$ changes symmetrically in response to step change in reference current.

Figure 19B:
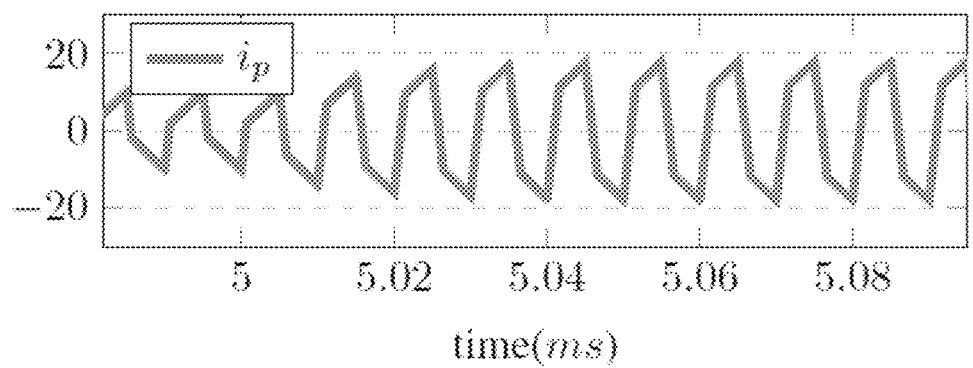
Figure 19C:
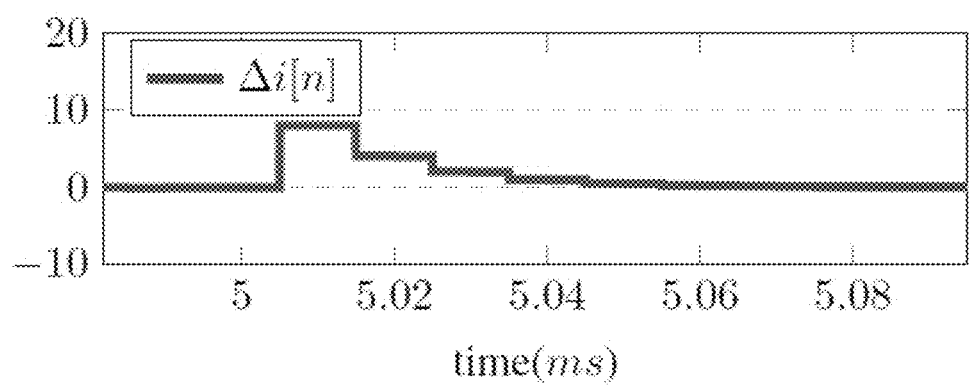
Figure 19D:
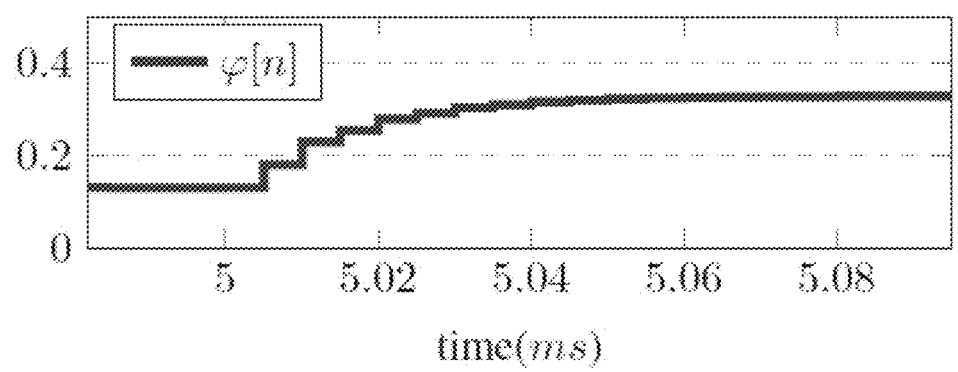

FIG. 19B depicts the transition of current at t=5 ms in enlarged scale. According to this figure, $i_p$ shows a symmetrical growth. FIG. 18C depicts the current error during this time interval. As can be seen, current error reduces by half in every switching cycle (as seen in Eq'n (60)). FIG. 19D depicts the smooth transition of the control variable ($\varphi$) in its trend towards steady state value of 0.19.

Figure 20A:
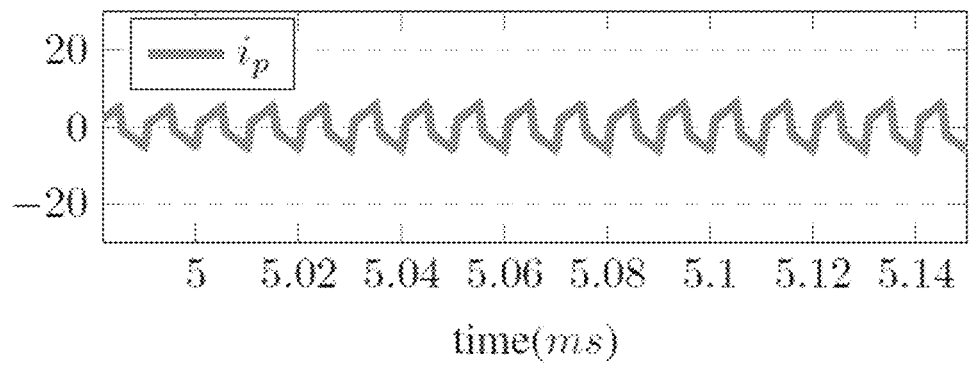
FIGS. 20A to 20C depict the performance of the control system of FIG. 2 when the series inductor is varied by 100%.
Figure 20B:
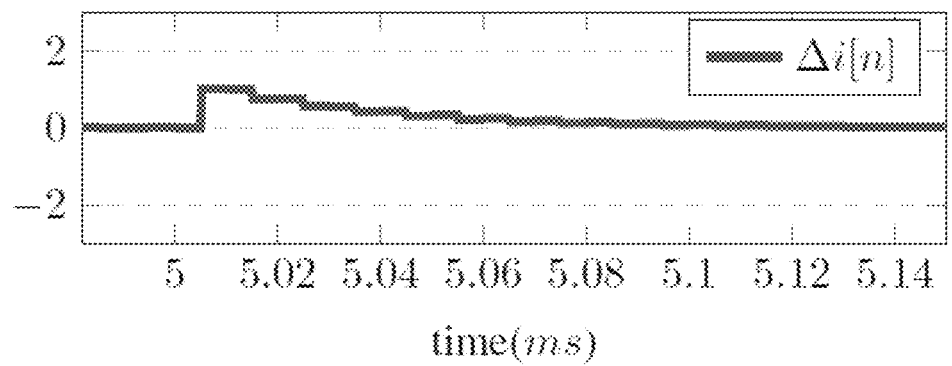
Figure 20C:
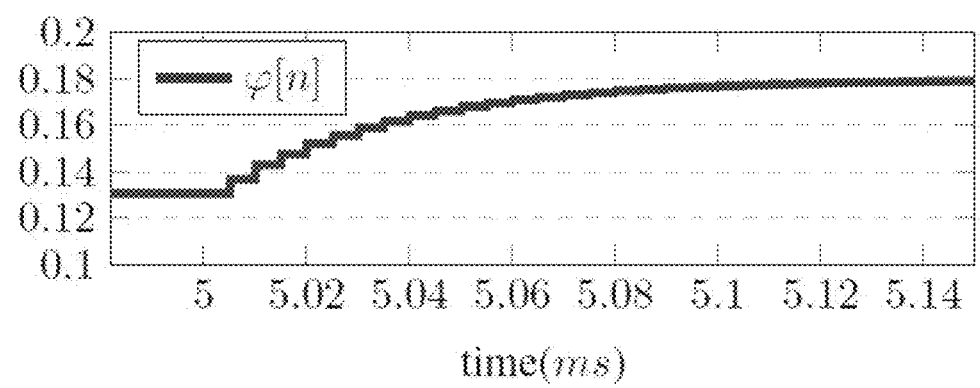

FIGS. 20A to 20C depict the control system performance when the series inductor is varied by 100% ($L_p$=20 μH). In this scenario, GSC shows a slower transient response compared to L=10 μH. Further, as can be seen, the GSC control system reduces the current error to zero, which shows the high robustness of the proposed control against uncertainties and fluctuations of the inductor.

Figure 21:
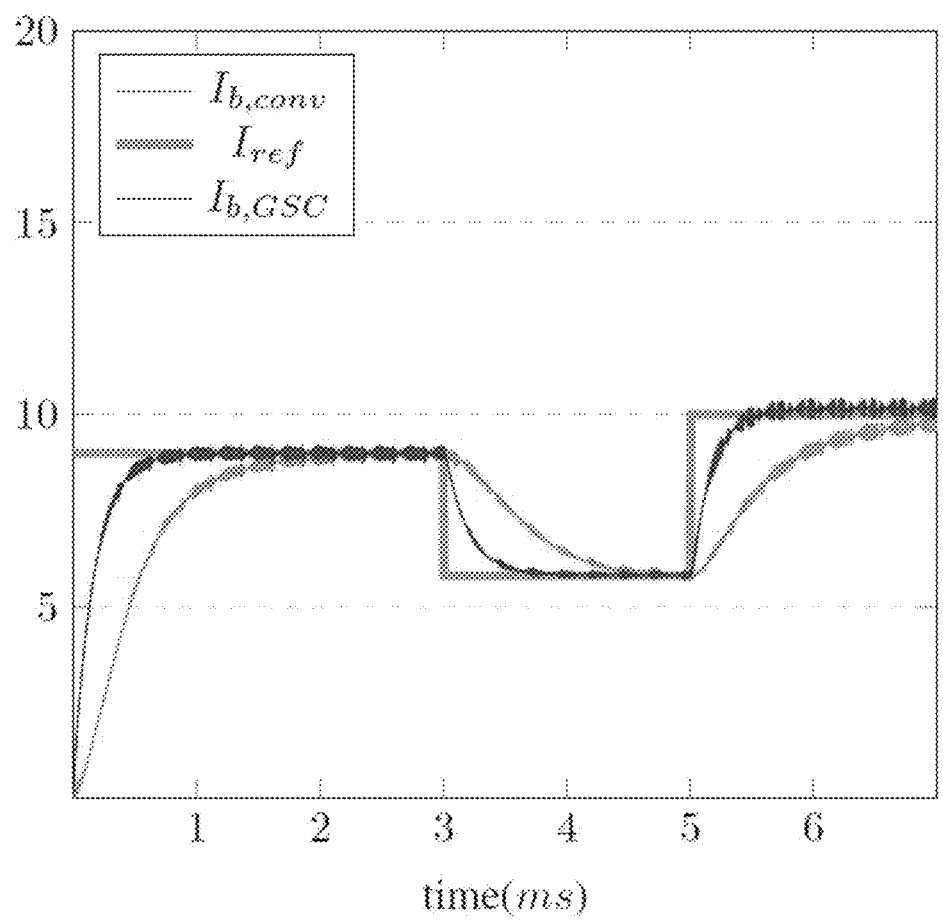
FIG. 21 is a plot comparing the transient response of the control system of FIG. 2 with the response of conventional PI controllers.

FIG. 21 is a plot showing the transient response of the GSC control system of the present invention, as compared to conventional PI controllers for DAB converters. As can be seen, the present invention provides faster response than conventional schemes.

Figure 22:
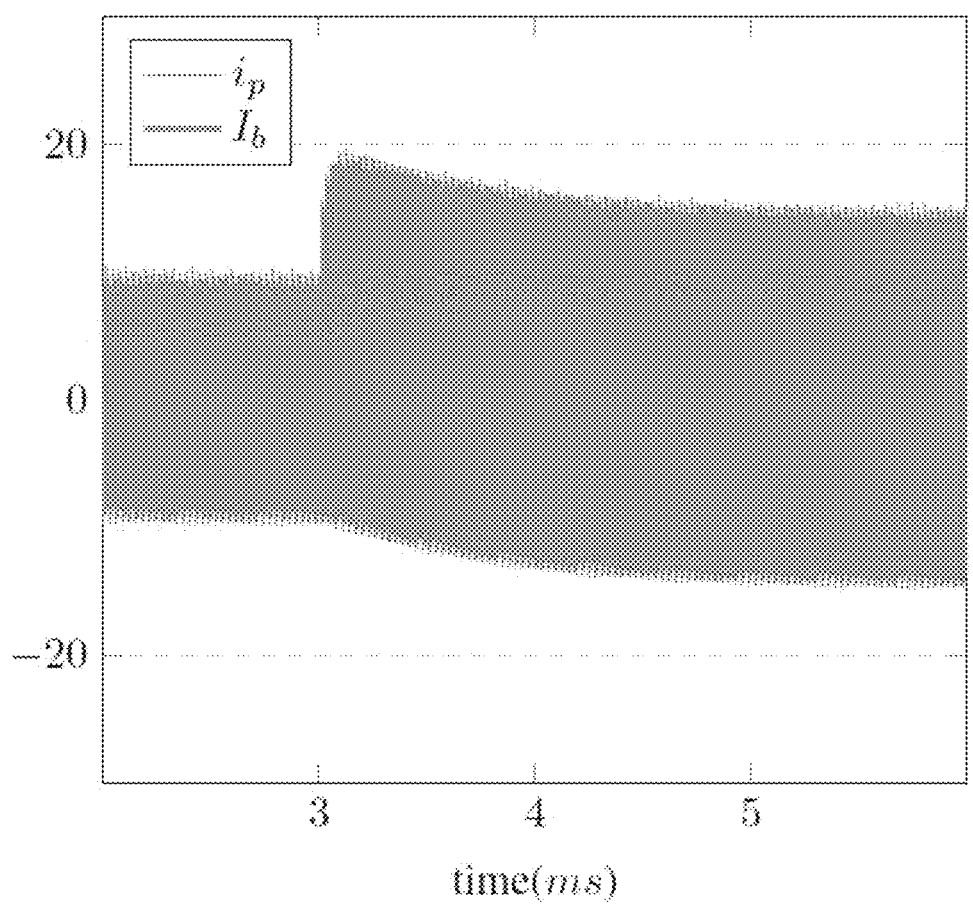
FIG. 22 illustrates the transient operation of a DAB converter with a conventional control system, according to the prior art.

FIG. 22 illustrates the transient operation of the converter in conventional application, where the control variables are changed every switching cycle (i.e., symmetric half cycle modulation scheme is employed). As can be seen, in this scenario, $i_p$ changes asymmetrically and the peak current can potentially rise to high values, causing temporary saturation of the transformer, as discussed above.

Figure 23:
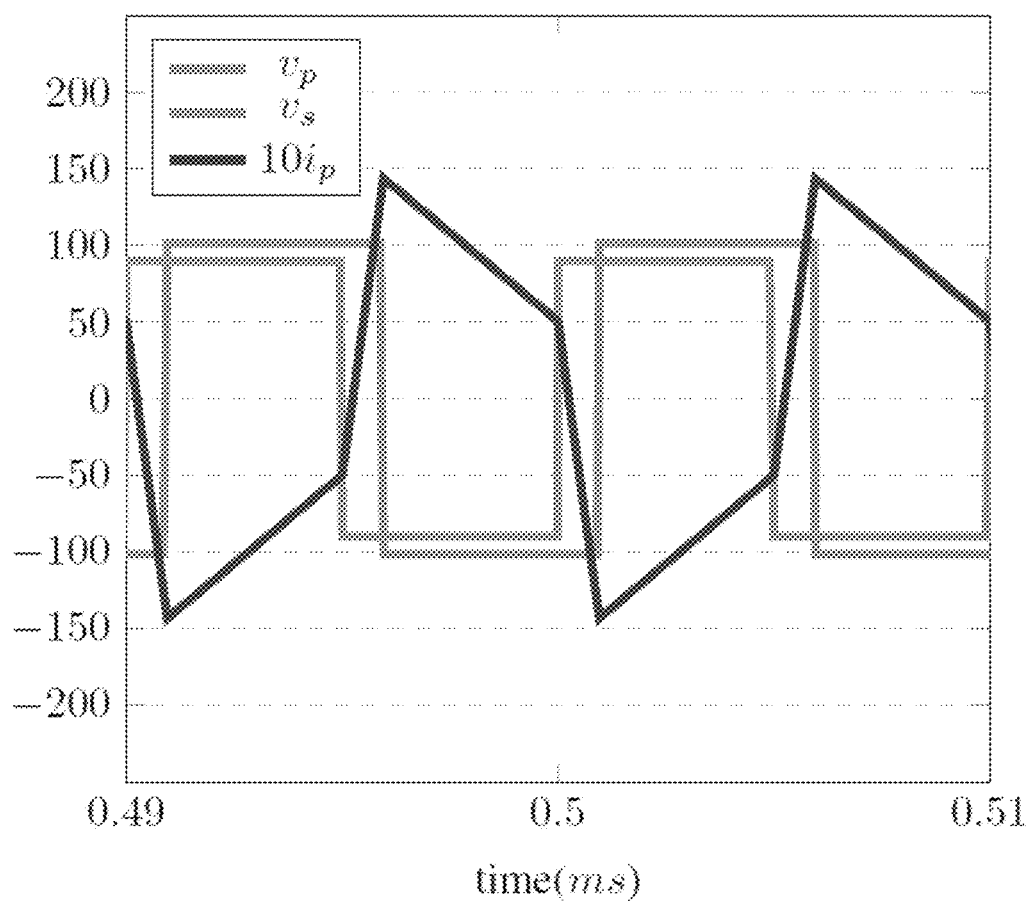
FIG. 23 depicts the steady-state operation of a DAB converter with a power flow from port B to port A, according to the prior art.

FIG. 23 depicts the steady-state operation of the converter when power is transferred from port B to port A. It can be seen that in this scenario, φ is negative. The steady state equation of power flow is the same as in power flow from port A to port B given in (10), but with negative sign. That is, reversing the direction of power flow in the system of FIG. 2 only changes the sign term, while the rest of the relations derived above remain the same.

Figure 24:
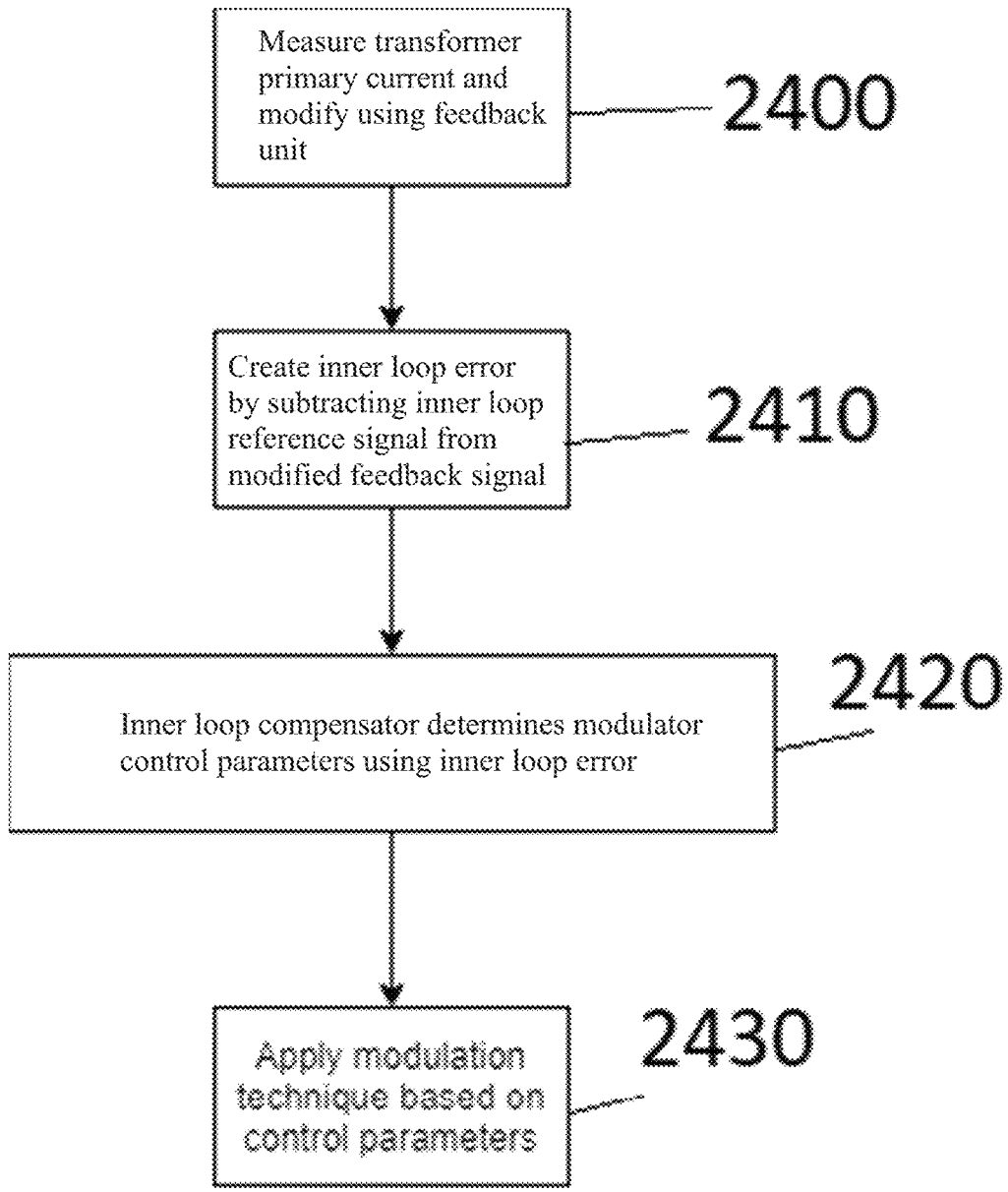
FIG. 24 is a flowchart detailing a method according to one aspect of the invention.

Referring now to FIG. 24, a flowchart illustrating a method according to one aspect of the invention is illustrated. The transformer primary current is measured every half switching cycle and modified by the feedback unit (step 2400). The inner loop reference signal is subtracted from the modified feedback signal to create the inner loop error (step 2410). The error is used by the GSC compensator (the inner loop compensator) to create the control parameters for the modulator (step 2420). Then, based on those control parameters, a modulation technique is applied to change the switching signals (step 2430). The modulation technique is one of PSM, VDM, or TCM, as detailed above. The modified switching signals changes the transformer primary current until it reaches the desired inner loop reference current (inner loop error becomes zero). The resulting feedback loop reduces error and increases reliability and efficiency of the DAB converter over a broad range of input conditions.

As noted above, for a better understanding of the present invention, the following references may be consulted:

[1] Krismer and Kolar, "Closed Form Solution for Minimum Conduction Loss Modulation of DAB Converters," *IEEE Transactions on Power Electronics*, vol. 27, DOI 10.1109/TPEL.21011.2157976, no. 1, pp. 174-188, January 2012.

[2] F. Krismer and J. W. Kolar, "Accurate Small-Signal Model for the Digital Control of an Automotive Bidirectional Dual Active Bridge," IEEE Transactions on Power Electronics, vol. 24, DOI 10.1109/TPEL.2009.2027904, no. 12, pp. 2756-2768, December 2009.

[3] F. Krismer and J. W. Kolar, "Accurate Power Loss Model Derivation of a High-Current Dual Active Bridge Converter for an Automotive Application," IEEE Transactions on Industrial Electronics, vol. 57, DOI 10.1109/TIE.2009.2025284, no. 3, pp. 881-891, March 2010.

[4] F. Krismer, S. Round, and J. W. Kolar, "Performance optimization of a high current dual active bridge with a wide operating voltage range," in 2006 37th IEEE Power Electronics Specialists Conference, DOI 10.1109/pesc.2006.1712096, pp. 1-7, June 2006.

It should be clear that the various aspects of the present invention may be implemented as software modules in an overall software system. As such, the present invention may thus take the form of computer executable instructions that, when executed, implement various software modules with predefined functions.

Further, as used herein, the expression "at least one of X and Y" means and should be construed as meaning "X or Y or both X and Y".

A person understanding this invention may now conceive of alternative structures and embodiments or variations of the above all of which are intended to fall within the scope of the invention as defined in the claims that follow.

We claim:

1. A control system for a dual active bridge (DAB) DC/DC converter, said control system comprising:
   a feedback unit;
   a compensator; and
   a modulator,
   wherein said feedback unit measures a transformer current from a bridge component of said DAB converter as input and wherein an inner loop reference current is subtracted from an output of said feedback unit;
   wherein an output of said subtraction is passed to said compensator;
   wherein said compensator determines control parameters for said modulator;
   wherein said compensator determines control parameters using a geometric-sequence-control (GSC) method; and
   wherein said modulator applies a modulation technique based on said control parameters to change a switching pattern to thereby control said transformer current and to thereby control a power flow in said circuit.

2. The control system according to claim 1, wherein said modulation technique is one of: phase-shift modulation (PSM), variable duty cycle modulation (VDM), and triangular current mode modulation (TCM).

3. The control system according to claim 1, wherein said feedback unit samples said transformer current once every half switching cycle.

4. The control system according to claim 1, wherein said compensator updates said control parameters once every half switching cycle.

5. The control system according to claim 1, wherein said modulator updates said switching pattern every half switching cycle.

6. The control system according to claim 1, wherein said GSC method is based on an error in said inner loop reference current.

7. The control system according to claim 1, wherein said GSC method is applied such that an error in said inner loop reference current decreases in a geometric sequence progression over successive half switching cycle samplings, and wherein said control parameters are by-products of said GSC method.

8. The control system according to claim 1, wherein said control parameters comprise at least one of: a phase shift of the converter, a duty cycle of said bridge component, and a duty cycle of another bridge component of said DAB converter.

9. The control system according to claim 1, wherein said system conforms to at least one of the following conditions;
   when a power level within said circuit is below a first threshold, said modulation technique is triangular current modulation (TCM);
   when said power level is between said first threshold and a second threshold, said modulation technique is variable duty cycle modulation (VDM), said second threshold being higher than said first threshold; and
   when said power level is above said second threshold, said modulation technique is phase-shift modulation (PSM).

10. A method for controlling a power flow within a circuit comprising a dual active bridge (DAB) DC/DC converter, said method comprising the steps of:
   receiving a current from a bridge component of said DAB converter as input for a compensator;
   measuring a current from a transformer component of said DAB converter;

based on said current, determining control parameters for a modulator;

determining said control parameters by applying a geometric-sequence-control (GSC) method; and using said modulator, applying a modulation technique based on said control parameters, to thereby modify said current and to thereby control said power flow in said circuit.

11. The method according to claim 10, wherein said modulation technique is one of phase-shift modulation (PSM), variable duty cycle modulation (VDM), and triangular current mode modulation (TCM).

12. The method according to claim 10, wherein said GSC method is based on inner loop current error.

13. The method according to claim 10, wherein said control parameters are determined by a compensator.

14. The method according to claim 13, wherein said compensator updates said control parameters once every half switching cycle.

15. The method according to claim 10, wherein said GSC method is applied such that an inner loop current error decreases in a geometric sequence progression over successive half switching cycle samplings, and wherein said control parameters are by-products of said GSC method.

16. The method according to claim 10, wherein said control parameters comprise at least one of: a phase shift of the converter, a duty cycle of said bridge component, and a duty cycle of another bridge component of said DAB converter.

17. The method according to claim 10, wherein said method conforms to at least one of the following conditions:

when a power level within said circuit is below a first threshold, said modulation technique is triangular current mode modulation (TCM);

when said power level is between said first threshold and a second threshold, said modulation technique is variable duty cycle modulation (VDM), said second threshold being higher than said first threshold; or when said power level is above said second threshold, said modulation technique is phase-shift modulation (PSM).

18. Non-transitory computer-readable media having encoded thereon computer-readable and computer-executable instructions that, when executed, implement a method for controlling a power flow within a circuit comprising a dual active bridge (DAB) DC/DC converter, said method comprising the steps of:

receiving a current from a bridge component of said DAB converter as input for a compensator;

measuring a current from a transformer component of said DAB converter;

based on said current, determining control parameters for a modulator;

determining said control parameters by applying a geometric-sequence-control (GSC) method; and using said modulator, applying a modulation technique based on said control parameters, to thereby modify said current and to thereby control said power flow in said circuit.

\* \* \* \* \*